(12) United States Patent
Dean et al.

(10) Patent No.: US 9,069,835 B2
(45) Date of Patent: Jun. 30, 2015

(54) ORGANIZING DATA IN A DISTRIBUTED STORAGE SYSTEM

(71) Applicants: Jeffrey Adgate Dean, Palo Alto, CA (US); Michael James Boyer Epstein, Brooklyn, NY (US); Andrew Fikes, Los Altos, CA (US); Sanjay Ghemawat, Mountain View, CA (US); Wilson Cheng-Yi Hsieh, Syosset, NY (US); Alexander Lloyd, New York, NY (US); Yasushi Saito, Mountain View, CA (US); Michal Piotr Szymaniak, Mountain View, CA (US); Sebastian Kanthak, San Jose, CA (US); Chris Jorgen Taylor, Palo Alto, CA (US)

(72) Inventors: Jeffrey Adgate Dean, Palo Alto, CA (US); Michael James Boyer Epstein, Brooklyn, NY (US); Andrew Fikes, Los Altos, CA (US); Sanjay Ghemawat, Mountain View, CA (US); Wilson Cheng-Yi Hsieh, Syosset, NY (US); Alexander Lloyd, New York, NY (US); Yasushi Saito, Mountain View, CA (US); Michal Piotr Szymaniak, Mountain View, CA (US); Sebastian Kanthak, San Jose, CA (US); Chris Jorgen Taylor, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 172 days.

(21) Appl. No.: 13/898,411

(22) Filed: May 20, 2013

(65) Prior Publication Data
US 2013/0339295 A1 Dec. 19, 2013

Related U.S. Application Data

(60) Provisional application No. 61/649,806, filed on May 21, 2012.

(51) Int. Cl.
*G06F 17/30* (2006.01)
*G06F 3/06* (2006.01)

(52) U.S. Cl.
CPC ........ *G06F 17/30575* (2013.01); *G06F 3/0611* (2013.01); *G06F 3/0617* (2013.01); *G06F 3/065* (2013.01); *G06F 3/067* (2013.01)

(58) Field of Classification Search
CPC .... G06F 17/30575; G06F 3/067; G06F 3/065
USPC .......................... 707/610, 821, 825, 828, 829
See application file for complete search history.

(56) References Cited

U.S. PATENT DOCUMENTS 6,477,544 B1  11/2002  Bolosky et al.
7,430,570 B1 *  9/2008  Srinivasan et al. .................... 1/1

(Continued)

FOREIGN PATENT DOCUMENTS

WO  WO 2011/100366 A2  8/2011
WO  WO 2012/040391 A1  3/2012

OTHER PUBLICATIONS

Ghemawat, The Google File System, Proc. of the ACM Symposium on Operating Systems Principles, Oct. 19, 2003, pp. 1-15.

(Continued)

*Primary Examiner* — Thanh-Ha Dang
(74) *Attorney, Agent, or Firm* — Morgan, Lewis & Bockius LLP

(57) ABSTRACT

A distributed storage system is provided. The distributed storage system includes multiple front-end servers and zones for managing data for clients. Data within the distributed storage system is associated with a plurality of accounts and divided into a plurality of groups, each group including a plurality of splits, each split being associated with a respective account, and each group having multiple tablets and each tablet managed by a respective tablet server of the distributed storage system. Data associated with different accounts may be replicated within the distributed storage system using different data replication policies. There is no limit to the amount of data for an account by adding new splits to the distributed storage system. In response to a client request for a particular account's data, a front-end server communicates such request to a particular zone that has the client-requested data and returns the client-requested data to the requesting client.

20 Claims, 15 Drawing Sheets

(56) References Cited

U.S. PATENT DOCUMENTS

| | | | |
|---|---|---|---|
| 2005/0015404 A1* | 1/2005 | Cherkasova | 707/104.1 |
| 2005/0149627 A1* | 7/2005 | Schreter | 709/223 |
| 2008/0243879 A1 | 10/2008 | Gokhale et al. | |
| 2009/0327642 A1* | 12/2009 | Ogihara et al. | 711/170 |
| 2011/0196664 A1* | 8/2011 | Zunger et al. | 703/21 |
| 2012/0159102 A1* | 6/2012 | Kan | 711/162 |
| 2012/0303791 A1* | 11/2012 | Calder et al. | 709/224 |
| 2013/0346365 A1* | 12/2013 | Kan et al. | 707/610 |
| 2015/0012497 A1* | 1/2015 | Clark et al. | 707/654 |

OTHER PUBLICATIONS

Ivanova, Self-Organizing Strategies for a Column-Store Database, Proc. of the 11th International Conference on Extending Database Technology Advances in Database Technology, EDBT'08, Mar. 25, 2008, pp. 157-168.

Google Inc., Invitation to Pay Additional Fees, PCT/US2013/042063, Jul. 30, 2013, 6 pgs.

Google Inc., International Preliminary Report on Patentability, PCT/US2013/044105, Dec. 9, 2014, 4 pgs.

Google Inc., International Preliminary Report on Patentability, PCT/US2013/044163, Dec. 9, 2014, 9 pgs.

Bernstein, Chapter 5-Multiversion Concurrency Control, Concurrency Control and Recovery in Database Systems, Jan. 1, 1987, 24 pgs.

Elmasri, Chapter 20-Physical Database Design and Tuning, Fundamentals of Database Systems, 6th Ed., Addison-Wesley, Jan. 1, 2011, 16 pgs.

Garcia-Molina, Chapter 18-Concurrency Control, Database Systems: The Complete Book, Prentice-Hall, Jan. 1, 2002, 72 pgs.

Garcia-Molina, Chapter 1-The Worlds of Database Systems, Database Systems: The Complete Book, Prentice Hall, Jan. 1, 2002, 21 pgs.

Google Inc., International Search Report and Written Opinion, PCT/US2013/044163, May 9, 2014, 11 pgs.

Zhang, Supporting Multi-Row Distributed Transactions with Global Snapshot Isolation Using Bare-Bones Hbase, 11th IEEE/ACM Int'l Conf. on Grid Computing, Piscataway, NJ, Oct. 25, 2010, pp. 177-184.

International Search Report and Written Opinion dated Nov. 14, 2013, received in International Application No. PCT/US2013/044105, which corresponds to U.S. Appl. No. 13/909,021, 7 pages (Yasushi Saito).

International Search Report and Written Opinion dated Dec. 13, 2013, received in International Application No. PCT/US2013/042063, which corresponds to U.S. Appl. No. 13/898,411, 17 pages (Jeffrey Adgate Dean).

* cited by examiner

ORGANIZING DATA IN A DISTRIBUTED STORAGE SYSTEM

RELATED APPLICATIONS

This application claims priority to U.S. Provisional Application Ser. No. 61/649,806, filed May 21, 2012, entitled "Organizing Data in a Distributed Storage System," which is incorporated by reference herein in its entirety.

TECHNICAL FIELD

The disclosed implementations relate generally to the management of a distributed storage system, and in particular, to system and method for organizing a large volume of data in a distributed storage system.

BACKGROUND

Internet has become a popular venue for people across the globe to store and exchange information. As the amount of data managed by the Internet rapidly increases, both individually and collectively, and the service associated with the data gets more complicated, it is becoming a constant challenge for an Internet-based service provider to mange such a large volume of data and render the associated service efficiently in response to different data access requests by users from anywhere in the world.

SUMMARY

In accordance with some embodiments described below, a method for adding data to a distributed storage system that includes a plurality of computer servers, each computer server including one or more processors and memory, is provided. The data within the distributed storage system is associated with a plurality of accounts and divided into a plurality of groups, each group including a plurality of splits and each split being associated with a respective account. The method includes: identifying a first split associated with an account, wherein the first split is a member of a first group of splits and the first split has a data range parameter indicating that more data can be added to the first split and a split size indicating an actual amount of data in the first split; in response to determining that the split size of the first split reaches a predefined limit: updating the data range parameter in the first split so that no data can be added to the first split; creating a second split for the account, wherein the second split includes a data range parameter indicating that more data can be added to the second split; adding the second split to a second group of splits; and replicating the second group of splits within the distributed storage system in accordance with a data replication policy associated with the account.

In accordance with some embodiments described below, a distributed storage system includes a plurality of zones, each zone including a plurality of computer servers and each computer server including one or more processors and memory, a plurality of network links that connects two respective zones, wherein data within the distributed storage system is associated with a plurality of accounts and divided into a plurality of groups, each group including a plurality of splits and each split being associated with a respective account, and a plurality of program, modules, wherein the plurality of program modules are stored in the memory of a respective computer server and to be executed by the one or more processors of the respective computer server. The plurality of program modules include instructions for: identifying a first split associated with an account, wherein the first, split is a member of a first group of splits and the first split has a data range parameter indicating that more data can be added to the first split and a split size indicating an actual amount of data in the first split; in response to determining that the split size of the first split reaches a predefined limit: updating the data range parameter in the first split so that no data can be added to the first split; creating a second split for the account, wherein the second split includes a data range parameter indicating that more data can be added to the second split; adding the second split to a second group of splits; and replicating the second group of splits within the distributed storage system in accordance with a data replication policy associated with the account.

In accordance with some embodiments described below, a non-transitory computer readable storage medium stores one or more program modules configured for execution by a computer server that includes one or more processors and memory and is part of a distributed storage system, wherein the distributed storage system is configured for dividing data associated with a plurality of accounts into a plurality of groups, each group including a plurality of splits and each split being associated with a respective account. The one or more programs include instructions for: identifying a first split associated with an account, wherein the first split is a member of a first group of splits and the first split has a data range parameter indicating that more data can be added to the first split and a split size indicating an actual amount of data in the first split; in response to determining that the split size of the first split reaches a predefined limit: updating the data range parameter in the first split so that no data can be added to the first split; creating a second split for the account, wherein the second split includes a data range parameter indicating that more data can be added to the second split; adding the second split to a second group of splits; and replicating the second group of splits within the distributed storage system in accordance with a data replication policy associated with the account.

In accordance with some embodiments described below, a method for replicating data within a distributed storage system that includes a plurality of computer servers, each computer server including one or more processors and memory, is provided. The data within the distributed storage system is associated with a plurality of accounts and divided into a plurality of groups, each group including a plurality of splits and each split being associated with a respective account. The method includes: dividing data associated with a first account and data associated with a second account into a first set of splits and a second set of splits, respectively, wherein the first account and the second account have different data replication policies; adding each of the first set of splits and the second set of splits to a respective group of splits, wherein there is no group including a member of the first set of splits and a member of the second set of splits; creating a predefined number of replicas for each group of splits that includes a member of the first set of splits and allocating the replicas within the distributed storage system in accordance with a data replication policy associated with the first account; and creating a predefined number of replicas for each group of splits that includes a member of the second set of splits and allocating the replicas within the distributed storage system in accordance with a data replication policy associated with the second account.

In accordance with some embodiments described below, a distributed storage system includes a plurality of zones, each zone including a plurality of computer servers and each computer server including one or more processors and memory, a plurality of network links that connects two respective zones, wherein data within the distributed storage system is associated with a plurality of accounts and divided into a plurality of groups, each group including a plurality of splits and each split being associated with a respective account, and a plurality of program modules, wherein the plurality of program modules are stored in the memory of a respective computer server and to be executed by the one or more processors of the respective computer server. The plurality of program modules include instructions for: dividing data associated with a first account and data associated with a second account into a first set of splits and a second set of splits, respectively, wherein the first account and the second account have different data replication policies; adding each of the first set of splits and the second set of splits to a respective group of splits, wherein there is no group including a member of the first set of splits and a member of the second set of splits; creating a predefined number of replicas for each group of splits that includes a member of the first set of splits and allocating the replicas within the distributed storage system in accordance with a data replication policy associated with the first account; and creating a predefined number of replicas for each group of splits that includes a member of the second set of splits and allocating the replicas within the distributed storage system in accordance with a data replication policy associated with the second account.

In accordance with some embodiments described below, a non-transitory computer readable storage medium stores one or more program modules configured for execution by a computer server that includes one or more processors and memory and is part of a distributed storage system, wherein the distributed storage system is configured for dividing data associated with a plurality of accounts into a plurality of groups, each group including a plurality of splits and each split being associated with a respective account. The one or more programs include instructions for: dividing data associated with a first account and data associated with a second account into a first set of splits and a second set of splits, respectively, wherein the first account and the second account have different data replication policies; adding each of the first set of splits and the second set of splits to a respective group of splits, wherein there is no group including a member of the first set of splits and a member of the second set of splits; creating a predefined number of replicas for each group of splits that includes a member of the first set of splits and allocating the replicas within the distributed storage system in accordance with a data replication policy associated with the first account; and creating a predefined number of replicas for each group of splits that includes a member of the second set of splits and allocating the replicas within the distributed storage system in accordance with a data replication policy associated with the second account.

In accordance with some embodiments described below, a method for locating data within a distributed storage system that includes a plurality of computer servers, each computer server including one or more processors and memory, is provided. The data within the distributed storage system is associated with a plurality of accounts and divided into a plurality of groups, each group including a plurality of splits, each split being associated with a respective account, and each group having multiple tablets and each tablet managed by a respective tablet server of the distributed storage system. The method includes: receiving a data access request from a client, wherein the data access request includes a logical identifier of data associated with an account; identifying one or more split identifiers associated with the logical identifier in accordance with the data access request, wherein each split identifier identifies a split associated with the account; for each of the identified one or more split identifiers: identifying a group identifier, wherein the group identifier corresponds to a group of splits; selecting one of the multiple tablets associated with the identified group based on information about the tablet servers managing the multiple tablets; communicating with the tablet server that manages the selected tablet for the split corresponding to the split identifier; and receiving the split from the tablet server; and forwarding the splits from the respective tablet servers to the requesting client.

In accordance with some embodiments described below, a distributed storage system includes a plurality of zones, each zone including a plurality of computer servers and each computer server including one or more processors and memory, a plurality of network links that connects two respective zones, wherein data within the distributed storage system is associated with a plurality of accounts and divided into a plurality of groups, each group including a plurality of splits, each split being associated with a respective account, and each group having multiple tablets and each tablet managed by a respective tablet server of the distributed storage system, and a plurality of program modules, wherein the plurality of program modules are stored in the memory of a respective computer server and to be executed by the one or more processors of the respective computer server. The plurality of program modules include instructions for: receiving a data access request from a client, wherein the data access request includes a logical identifier of data associated with an account; identifying one or more split identifiers associated with the logical identifier in accordance with the data access request, wherein each split identifier identifies a split associated with the account; for each of the identified one or more split identifiers: identifying a group identifier, wherein the group identifier corresponds to a group of splits; selecting one of the multiple tablets associated with the identified group based on information about the tablet servers managing the multiple tablets; communicating with the tablet server that manages the selected tablet for the split corresponding to the split identifier; and receiving the split from the tablet server; and forwarding the splits from the respective tablet servers to the requesting client.

In accordance with some embodiments described below, a non-transitory computer readable storage medium stores one or more program modules configured for execution by a computer server that includes one or more processors and memory and is part of a distributed storage system, wherein the distributed storage system is configured for dividing data associated with a plurality of accounts into a plurality of groups, each group including a plurality of splits, each split being associated with a respective account, and each group having multiple tablets and each tablet managed by a respective tablet server of the distributed storage system. The one or more programs include instructions for: receiving a data access request from a client, wherein the data access request includes a logical identifier of data associated with an account; identifying one or more split identifiers associated with the logical identifier in accordance with the data access request, wherein each split identifier identifies a split associated with the account; for each of the identified one or more split identifiers: identifying a group identifier, wherein the group identifier corresponds to a group of splits; selecting one of the multiple tablets associated with the identified group based on information about the tablet servers managing the multiple tablets; communicating with the tablet server that manages the selected tablet for the split corresponding to the split identifier; and receiving the split from the tablet server; and forwarding the splits from the respective tablet servers to the requesting client.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1A:
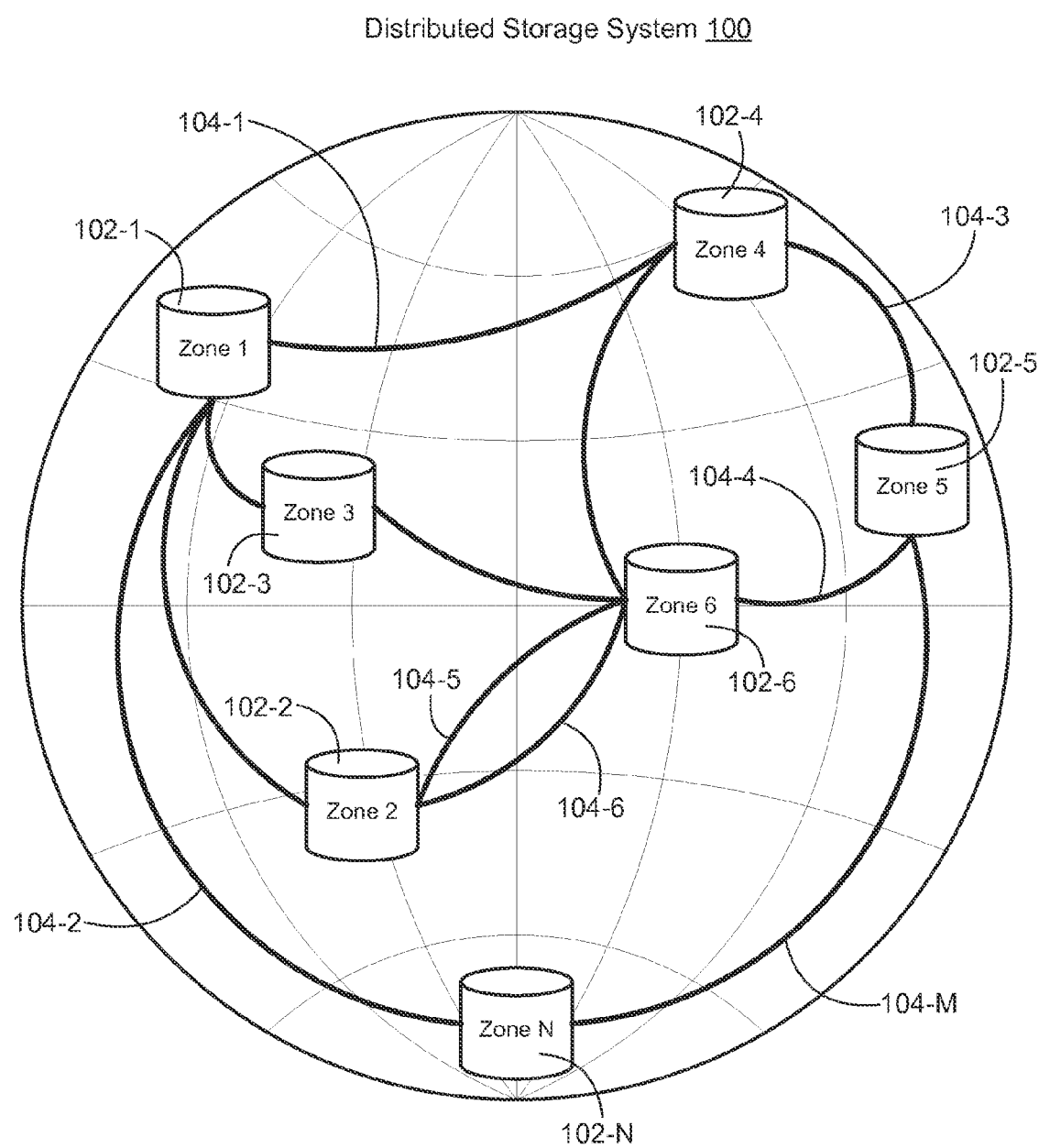
FIGS. 1A through 1G are block diagrams, each illustrating certain aspects of a distributed storage system in accordance with some embodiments.

FIGS. 1A through 1G are block diagrams, each illustrating certain aspects of a distributed storage system in accordance with some embodiments. In particular, FIG. 1A depicts a distributed storage system 100 according to some implementations of the present application. The distributed storage system 100 includes a plurality of zones 102-1, 102-2, . . . 102-N at various locations across the world, connected by network communication links 104-1, 104-2, . . . 104-M. In some embodiments, a zone (such as the zone 1 102-1) corresponds to one or more data centers that are geographically close to each other. For example, the North American region may correspond to one zone that includes two data centers, one located near the Pacific Coast and the other one located near the Atlantic Coast. Although the conceptual diagram of FIG. 1A shows a limited number of network communication links 104-1, etc., typical embodiments would have many more network communication links. In some embodiments, there are two or more network communication links between the same pair of zones, as illustrated by links 104-5 and 104-6 between the zone 2 (102-2) and the zone 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, each zone maintains the statistic information about the transfer of data across one or more of the network communication links within the distributed storage system 100, including throughput rate, times of availability, reliability of the links, etc.

Figure 1B:
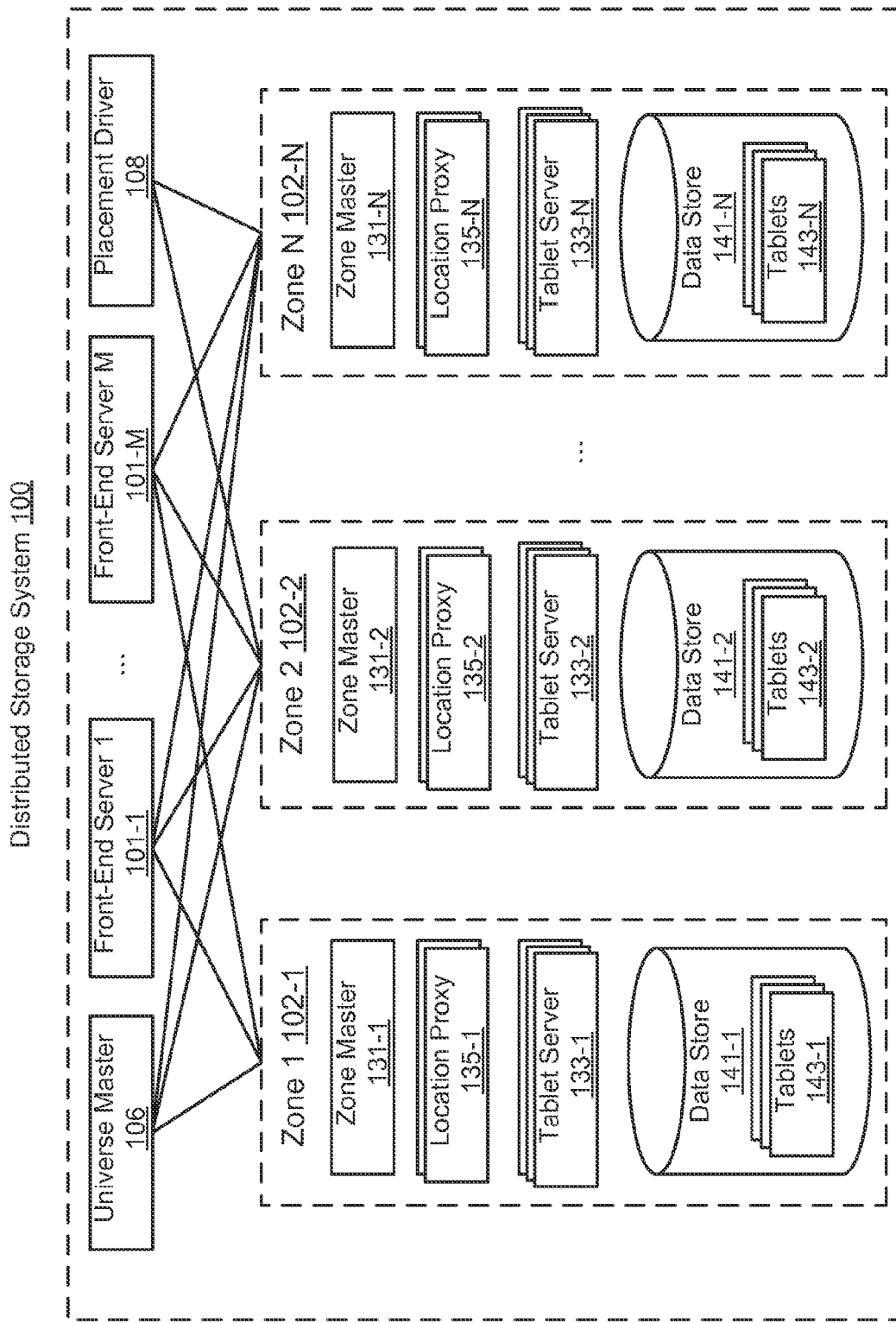

FIG. 1B depicts the components of the distributed storage system 100 according to some implementations of the present application. The distributed storage system 100 includes a universe master 106, one or more front-end servers (101-1, . . . , 101-M), a placement driver 108, and a plurality of zones (102-1, 102-2, . . . , 102-N). The universe master 106 and the placement driver 108 are responsible for monitoring the performance of the system 100 and controlling the data replication/migration between two zones. A zone (102-1, 102-2, . . . , 102-N) typically includes a data store (141-1, 141-2, . . . , 141-N) hosting a plurality of tablets (143-1, 143-2, . . . , 143-N), and utilizes a cluster of computer servers, including a zone master (131-1, 131-2, . . . , 131-N), one or more location proxies (135-1, 135-2, . . . , 135-N), one or more tablet servers (133-1, 133-2, . . . , 133-N) to perform all of the tablet-related tasks. The data store (141-1, 141-2, . . . , 141-N) provides the underlying persistent storage space for data managed by a corresponding zone (102-1, 102-2, . . . , 102-N). In some embodiments, data within the data store (141-1, 141-2, . . . , 141-N) are organized into many tablets, which is a basic data unit handled within a particular zone. The zone master (131-1, 131-2, . . . , 131-N) is responsible for assigning each tablet in the data store (141-1, 141-2, . . . , 141-N) to one of the tablet servers (133-1, 133-2, . . . , 133-N) for handling read/write requests directed at the tablet based, at least in part, on the CPU and memory usage at the tablet servers. For example, when the zone master determines that one tablet server is overloaded, it may orchestrate the migration of some tablets from this overloaded tablet server to other tablet servers in the same zone or maybe even another zone. A location proxy provides a location-lookup service to another entity (e.g., a front-end server or a tablet server) such that, for a given tablet, the location proxy identifies a respective tablet server that has been chosen for handling the read and write requests directed at the tablet.

Figure 1C:
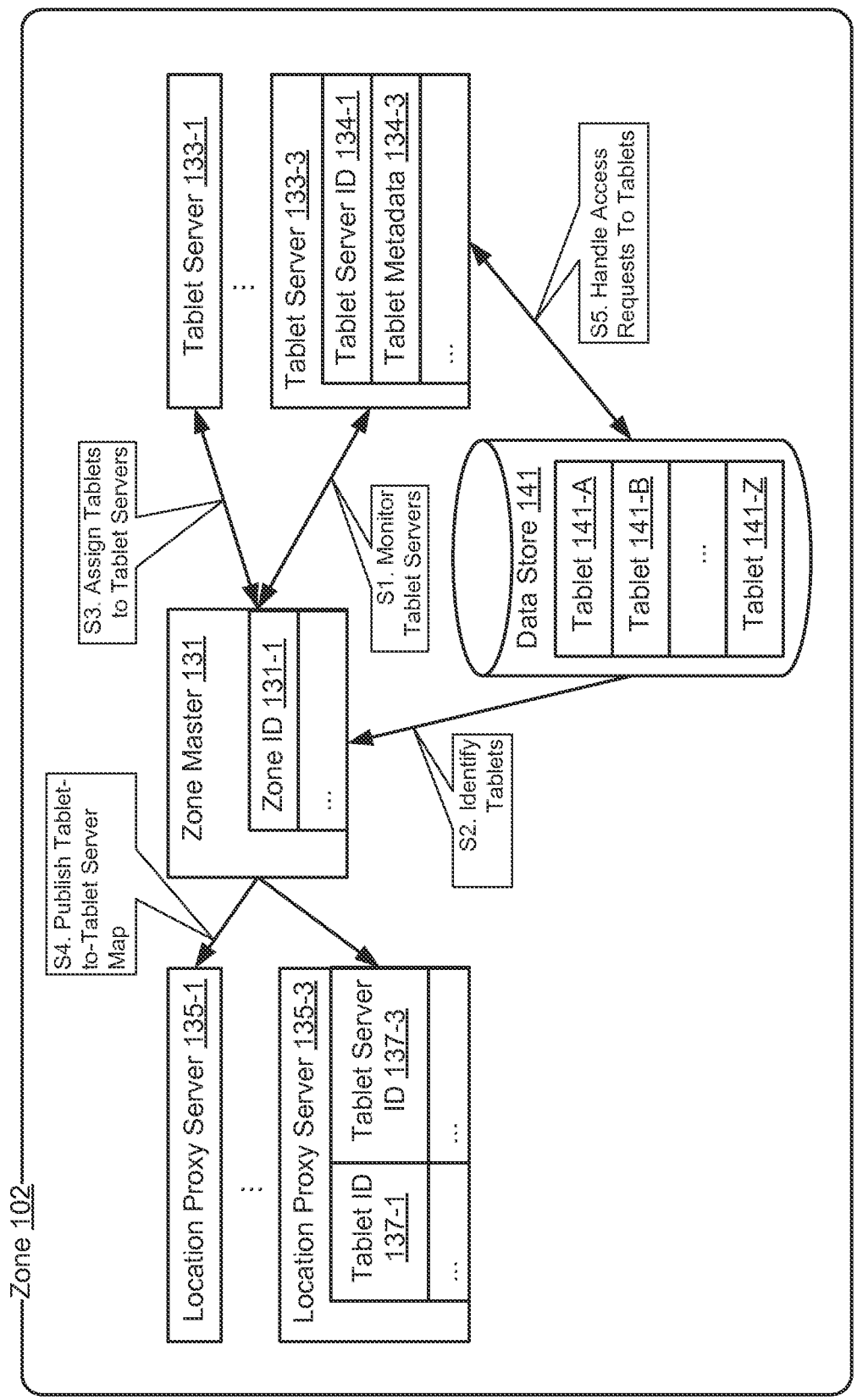

FIG. 1C illustrates in more detail how different components within a zone coordinate with each other to perform various tablet-related tasks according to some implementations of the present application. In this example, the zone 102 includes a zone master 131, a plurality of tablet servers (133-1, 133-3), a plurality of location proxy servers (135-1, 135-3), and a data store 141 that includes multiple tablets (141-A, 141-B, . . . , 141-Z). The zone master 131 has a zone ID 131-1 that uniquely identifies the zone 102 among a plurality of zones in a distributed storage system as shown in Figure 1B. As will be described below in connection with FIG. 1D, the zone ID is used by a front-end server 101 for determining which zone includes the client-requested data. As described above, the location proxy servers (135-1, 135-3) provide a location-lookup service to other entities. In some embodiments, a location proxy server uses a lookup table to support the location-lookup service. FIG. 1C depicts an exemplary lookup table, each row of the table including a tablet ID 137-1 and a tablet server ID 137-3. In response to a tablet ID provided by another entity, the location proxy server returns a tablet server ID to the requesting entity, which identifies a tablet server that is chosen by the zone master 131 for managing the corresponding tablet associated with the tablet ID. Accordingly, the requesting entity can communicate with the identified tablet server with respect to tasks associated with the tablet. A tablet server 133-3 is identified by a tablet server ID 134-1 and further includes tablet metadata 134-3 associated with the tablets managed by the tablet server 133-3. For example, the tablet metadata 134-3 includes the tablet IDs of the tablets managed by the tablet server 133-3. In some embodiments, the tablet metadata 134-3 also includes information about the splits associated with the tablet. A more detailed description of the relationship between a split and a tablet is provided below in connection with FIG. 1D.

In some embodiments, the zone master 131 monitors the performance of the tablet servers (133-1, 133-3) by periodically (e.g., after every 10 seconds) communicating with the tablet servers (133-1, 133-3). A tablet server reports to the zone master 131 its current status information, including its CPU and memory usage, etc., as well as other information used for determining the association between a set of tablets and the tablet server. Based on such information, the zone master 131 determines whether or not to assign a tablet in the data store 141 to a corresponding tablet server. For example, the zone master 131 may identify some tablets associated with one tablet server 133-3, which is deemed to be overloaded, and assign the identified tablets to another tablet server 133-1, In addition, the zone master 131 publishes the updated tablet-to-tablet server map through the location proxy servers (135-1, 135-3), When another entity (e.g., a front-end server or a tablet server) wants to learn which tablet server is responsible for managing a particular tablet, the entity can query one of the location proxy servers by providing a tablet ID and receiving a corresponding tablet server ID associated with the tablet ID. After identifying a tablet server for a particular tablet through the location-lookup service, the entity can communicate with the identified tablet server for any read/write access requests directed at the tablet.

Figure 1D:
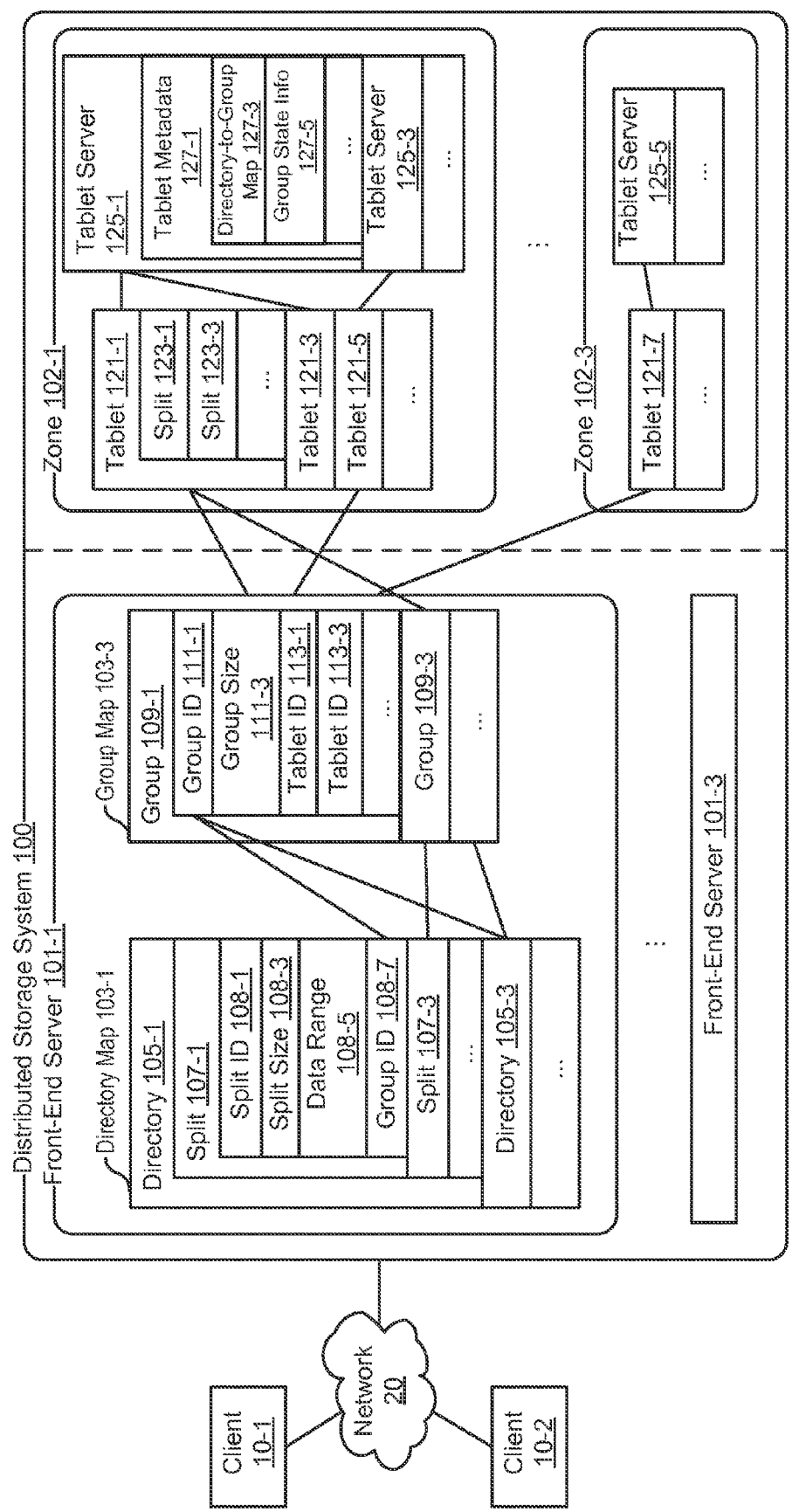

FIG. 1D illustrates how different components within the distributed storage system 100 interact with each other to satisfy data access requests from different clients according to some implementations of the present application. In this example, the clients (10-1, 10-2) are connected to the distributed storage system 100 via a network 20 (e.g., Internet) and they send requests for accessing data hosted by the distributed storage system 100. In this application, the term "client" may refer to a client computer (e.g., a desktop/laptop computer or a mobile device such as a tablet computer or a smartphone) from which an end user initiates a request for accessing a piece of data managed by the distributed storage system 100. Alternatively, the term "client" may refer to a computer server that provides on-line services (e.g., email or advertising) to multiple users and uses the distributed storage system 100 for hosting data associated with the on-line services. In either case, the distributed storage system 100 is responsible for identifying and returning the client-requested data to the requesting clients upon receipt of such requests from the clients. For illustrative purposes, it is assumed that one of the clients is an on-line advertising service provider and the distributed storage system 100 hosts data associated with different customers of the on-line advertising service provider.

When the client wants to access data associated with a customer, it submits a data access request to a front-end server 101. In some embodiments, different front-end servers (shown in FIG. 1C) are responsible for providing data-related services to different clients. For example, some of the front-end servers are configured for handling data access requests from clients for access email service data and some other front-end servers are configured for handling data access requests from clients for access advertising service data. In some embodiments, data associated with an online service application is further partitioned into multiple portions and each front-end server is configured for handling a subset of the data access requests for one or more portions of the data. In some embodiments, the front-end servers of the distributed storage system are located at different geographical locations to provide services to nearby clients that submit data access requests associated with different online services. As shown in FIG. 1D, a client submits a data access request by invoking an application programming interface (API) accepted by the front-end server 101. The data access request includes identification information of the one or more customers. In some embodiments, the data associated with a customer corresponds to a row in a data table and the row of customer data is further divided into multiple columns. The data access request may include a row identifier and possibly one or more column identifiers if the client is interested in accessing data in the one or more columns associated with each customer. Upon receipt of the data access request, the front-end server 101 needs to determine where the client-requested data is located in the distributed storage system 100 such as information about the zone and tablet(s) that have the client-requested data.

As shown in FIG. 1D, different components in the distributed storage system 100 are organized into two domains based on their respective roles: (i) the logical domain including the front-end servers (101-1, 101-3) and (ii) the physical domain including the zones (102-1, 102-3). The front-end servers handle data access requests from the external clients and use data structures such as the directory map 103-1 and the group map 103-3 to free the clients from understanding how data is physically stored in the distributed storage system 100. In some embodiments, each customer of the on-line advertising service is associated with one directory in the directory map 103-1. Based on the logical directory identifier provided by a client, the front-end server 101-1 identifies a particular entry in the director map 103-1, which corresponds to the particular customer.

To improve the scalability of the distributed storage system 100, data associated with a customer is divided into multiple segments, which are referred to as "splits", each split having a unique split ID in the directory map 103. As shown in FIG. 1D, each directory (e.g., directory 105-1) includes one or more splits (107-1 and 107-3). The number of splits associated with a directory is determined by the size of data associated with a corresponding customer. The more data the customer has, the more splits the data may be divided into. When the size of data within a split reaches a predefined threshold, no more data is added to the split and a new split is generated for hosting new data associated with the account. In some embodiments, there is no limit on the size of data for an account. In other embodiments, the size of data for an account is set to a predetermined limit. The predetermined limit may be determined by the distributed storage system 100 (e.g., a global limit of the size of data that is applied to all accounts), the application for which the data for the account is associated (e.g., a web mail application may impose a limit of the size of data for its accounts that are different than an advertisement application), and/or may be increased if an end user purchases more storage space for an account. Note that the client (i.e., the on-line advertising service provider) does not need to know which split(s) has the client-requested data. Instead, the client specifies the requested data in a request using a format defined by the client-associated online service provider and the front-end server 101-1 translates the client request into a set of split IDs that identify the splits including the client-requested data.

To improve the reliability and efficiency of the distributed storage system 100, data associated with a customer is replicated into multiple copies and stored in different tablets of one or more zones. In other words, the basic data unit for a particular customer in a front-end server is a split and the basic data unit in a zone is a tablet. As shown in FIG. 1D, a group in the group map 103-2 is defined to associate a split in the directory map 103-1 with a plurality of tablets in a particular zone. In this example, the split 107-1 is a data structure associating the split ID 108-1 with a group ID 108-7, which corresponds to an entry 109-1 in the group map 103-3. The split 107-1 also includes a split size 108-3 indicating the actual amount of data currently within this split range indicator 108-5. As will be described below, the data range indicator is used for indicating whether the split has space for more data or not. When the split runs out of space, a new split (e.g., split 107-3) will be created for hosting new data associated with the account. In this example, the split 107-3 is associated with the group 109-3, not the group 109-1. Note that different splits associated with an account may belong to the same group of splits or different groups of splits. Each group includes a plurality (e.g., hundreds or even thousands) of splits associated with different accounts and has a predefined group limit. The exact association between a split and a group is dynamically determined based, in part, on the remaining capacity of a particular group. In some embodiments, the front-end server tries to add different splits associated with the same account to the same group because these splits are likely to be accessed by a client at the same time and it is probably more convenient for them to be within the same group and therefore the same set of tablets, which are replicas of the group. If the group (e.g., group 109-1) runs out of space, the front-end server may identify another group (e.g., group 109-3) for the split 107-3. In some embodiments, the data replication policy is defined for each account, the group 109-3 is chosen for the split 107-3 because it has the same number of tablets as the group 109-1. In other words, splits associated with different accounts that have different data replication policies should be added to different groups with different numbers of tablets.

In accordance with a data replication policy provided by the client, a predefined number of instances of the group are generated in the distributed storage system 100, each instance of the group being referred to as a tablet. As shown in FIG. 1D, the group 109-1 has a group ID 111-1 (which is the same as the group ID 108-7 in the split 107-1), a group size 111-3, and a list of tablet IDs (e.g., tablet IDs 113-1, 113-3) of the group. Splits associated with different directories (e.g., directory 105-1 and directory 105-3) both belong to the group 109-1, suggesting that the two accounts corresponding to the two directories have the same data replication policy. In response to a client request, the front-end server 101-1 first identifies one or more split IDs in the directory map 103-1, which are associated with a customer identified by the client request, and then identifies a group and an associated list of tablet IDs for each split ID. FIG. 1D depict an embodiment in which different splits (as identified by the split IDs 107-1 and 107-3) associated with one customer are assigned to different groups (the group 109-1 and the group 109-3). This situation happens when the size of a group reaches a predefined group limit such that it is less efficient to keep all the data associated with one customer (e.g., multiple splits) in one group and therefore one tablet.

After the front-end server 101-1 identifies the tablet IDs in a group of splits that includes the client-requested data, the process of accessing the client-requested data is shifted from the logical domain to the physical domain, i.e., a zone that includes the tablets associated with the identified tablet IDs. In some embodiments, a tablet ID (113-1 or 113-3) includes a respective zone ID embedded therein. Therefore, after identifying the tablet IDs, the front-end server 101-1 also knows which zone has the client-requested data. As noted above, each zone includes one or more location proxy servers that provide the location-look up service for identifying a particular tablet server for each tablet. Based on the zone ID included in a tablet ID, the front-end server 101-1 submits a query to a respective location proxy server at a particular zone identified by the zone ID, the query including one or more tablet IDs (113-1, 113-3). The location proxy server then returns one or more tablet server IDs, each tablet server ID identifying a respective tablet server (e.g., the tablet server 125-1 or the tablet server 125-3) that has been chosen by the zone master for managing the data access requests to the particular tablet. Upon receipt of the one or more tablet server IDs, the front-end sever 101-1 submits a request to a corresponding tablet server, the request including identification of one or more splits (e.g., splits 123-1 and 123-3) within the tablet (e.g., the tablet 121-1). In response to the request, each tablet server identifies a corresponding tablet in the data store and performs the operations to the identified tablet accordingly.

Figure 1E:
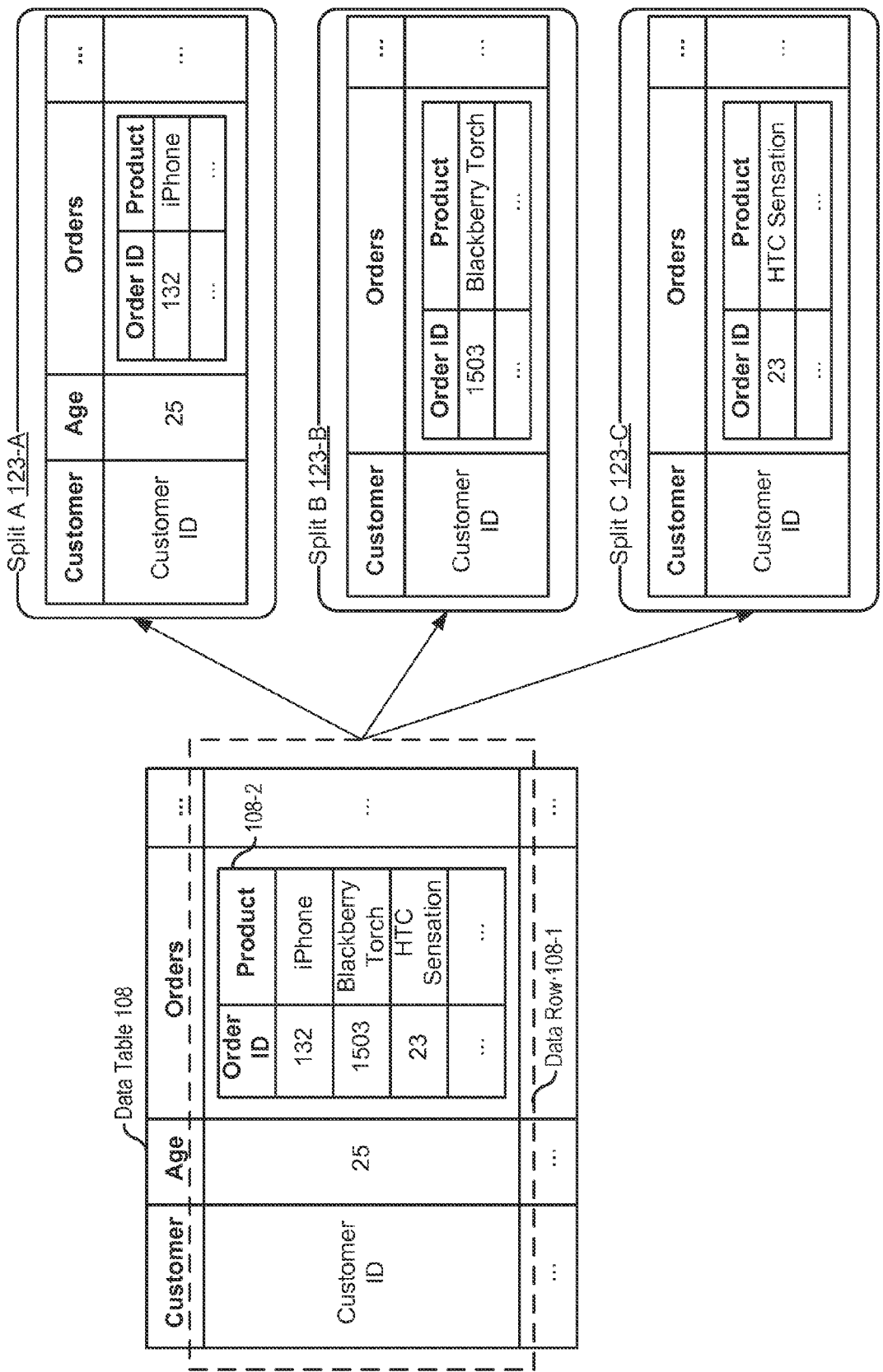

FIG. 1E illustrates how the customer data of an on-line advertising service is divided into multiple splits according to some embodiments of the present application. The data table 108 illustrates how the customer data is stored in a table-like data structure. As shown in the figure, each row 108-1 in the data table 108 represents the data associated with a particular customer whose customer ID is a primary key of the data row. The data row 108-1 includes multiple columns. Some columns such as the "Customer" column and the "Age" column each have one attribute value whereas some other columns include an embedded data structure (e.g., the embedded table 108-2). As shown in the figure, the data row 108-1 is divided into multiple splits (123-A, 123-B, 123-C) to accommodate the continuing addition of new data to the row, each split including a subset of the data row. In some embodiments, the partition of data columns into different splits is based on the relationships between different columns. For example, columns that are often accessed together are put into one split for efficiency. An embedded table within a particular column may be divided into multiple sections with each section belonging to one split as shown in FIG. 1E. As noted above, each split has a split ID for uniquely identifying the split. In some embodiments, the split ID is content-addressable. For example, the split ID may include information about the customer ID associated with the data row 108-1, the metadata associated with the split (e.g., the name of the columns in the split), and the customer data stored within the split. With such content-addressable split ID definition, it is easy for the front-end server to determine: (i) which split (and therefore a corresponding tablet) has the client-requested data based on the information in the client request and (ii) which split (and therefore a corresponding tablet) does not have the client-requested data and can be ignored for the particular client request. As a result, the front-end server only needs to communicate with a tablet server that is responsible for managing the tablet. In some embodiments, the split ID includes a range of string-like keys that correspond to a range of data associated with a customer.

Referring back to FIG. 1D, a tablet 121-1 may include splits corresponding to multiple groups of splits (109-1, 109-3). By including as many groups as possible within a tablet, the total number of tablets can be reduced, which makes it easier to manage the transactions directed to different groups that are associated with the same tablet. For example, the reduction of tablets will consume less messages/resources for maintaining the relationship between different tablets. There are fewer entities in the distributed storage system 100 to deal with. With the reduction of tablets, transactions on a set of neighboring directories in the directory map will likely be localized to a single set of tablets at a particular zone and will therefore be executed as a transaction at a single site (e.g., a tablet server) instead of transactions at multiple sites that might involve multiple tablet servers. In some embodiments, the reduction of tablets makes it more likely that a child director) is placed in the same group as its parent directory. By doing so, a front-end server can direct a call to the child directory to the location of the parent directory, which reduces the size of the required location cache at the front-end server and allows clients to start up faster since they will have to load fewer locations. In some embodiments, the location of the parent directory does not correspond to the location of location of the child directory. In this case, if the client has a big payload, it may first send a verification message to the tablet server that manages the tablet including the parent directory and determine if the child directory is co-located in the same tablet. Only after receiving a positive confirmation, will the client send its payload to the tablet server. All these performance benefits can significantly reduce the cost of introducing a new directory to the distributed storage system and make it more likely that clients will map their structures to directories naturally instead of trying to form larger directories.

As shown in FIG. 1D, a tablet server 125-1 further includes tablet metadata 127-1 associated with tablets (121-1, 121-3) managed by the tablet server. In this example, the tablet metadata 127-1 includes a directory-to-group map 127-3 and group state information 127-5. The directory-to-group map 127-3 locates a particular group within a tablet for a particular directory in the directory map. The group state information 127-5 includes the state information for a particular group replica, such as the log data, view information, the list of group replicas, etc. Given a directory associated with a tablet, the tablet server can scan the directory-to-group map for an entry that has the same directory name. Once an entry is identified, the tablet server can access the corresponding group state information using a group ID within this entry. In some embodiments, the tablet server supports the removal of a range of directories from a tablet by eliminating data associated with each directory within the range from the tablet when removing a directory replica from the tablet.

In some embodiments, one group in the distributed storage system may be split into two or more groups for several reasons. For example, a tablet containing the group is overloaded or too large. In this case, splitting the group may help reduce the load of the tablet if, e.g., this group contributes to a significant fraction of the load or size of the tablet. Sometimes, access patterns for some directories within a group are very different from access patterns for the rest of the group. For example, a group may be split into two if most directories in the group are accessed from US, but a particular set of directories in the group are mostly accessed from Europe.

Figure 1F:
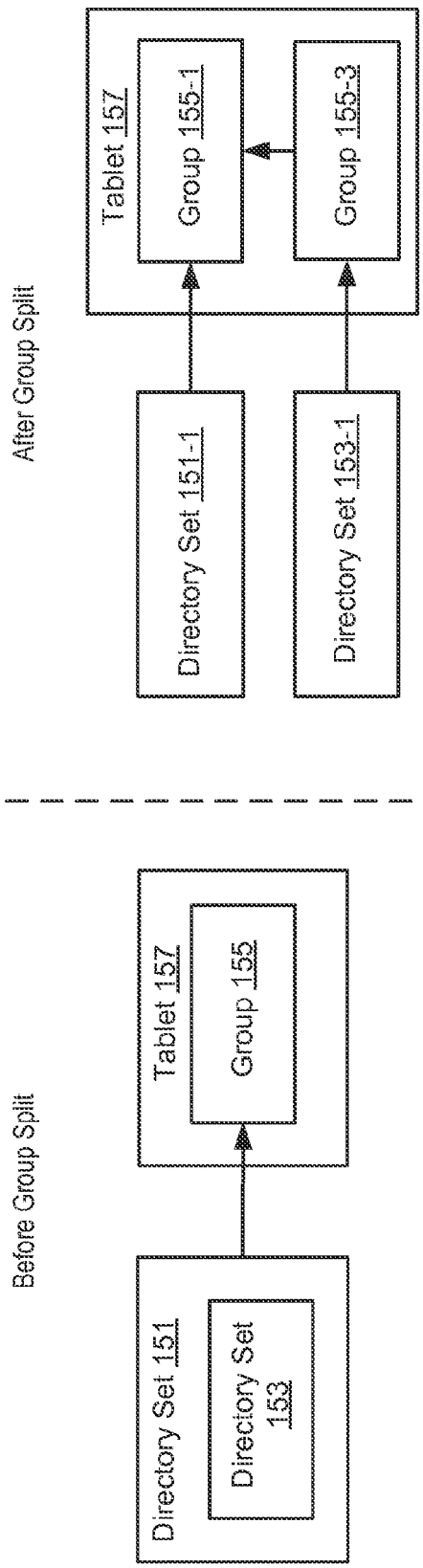

As shown in FIG. 1F, the directory set 151 is associated with the group 155, which is a member of the tablet 157. It is assumed that the directory set 153, which is a subset of the directory set 151 before the movement, will be moved to another group. To do so, a new group is created within each of the same set of tablets that include the group 155 by making a replica of the group 155. After the creation, the new group can be changed via the normal replica addition or removal. In this example, the group split is implemented as a single-site transaction on the group 155 and the transaction update is applied at every replica of the group 155. As shown in FIG. 1F, at the completion of the transaction, a new group 155-3 is created within the tablet 157 and the old group 155 is updated to the group 155-1 to reflect the group split such that each directory in the new directory set 153-1 (which corresponds to the old directory set 153) is associated with the new group 155-3. The metadata associated with the new group 155-3 is populated such that it inherits at least a portion of the metadata associated with the group 155-1, indicating that the relationship between the two groups 155-1 and 155-3. By doing so, the metadata associated with the group 155-1 (e.g., the list of tablet IDs) does not change. It should be noted that splitting a group does not actually move any user data associated with the group. This makes the split fast because the transaction cost is independent of the sizes of the directories being moved.

Figure 1G:
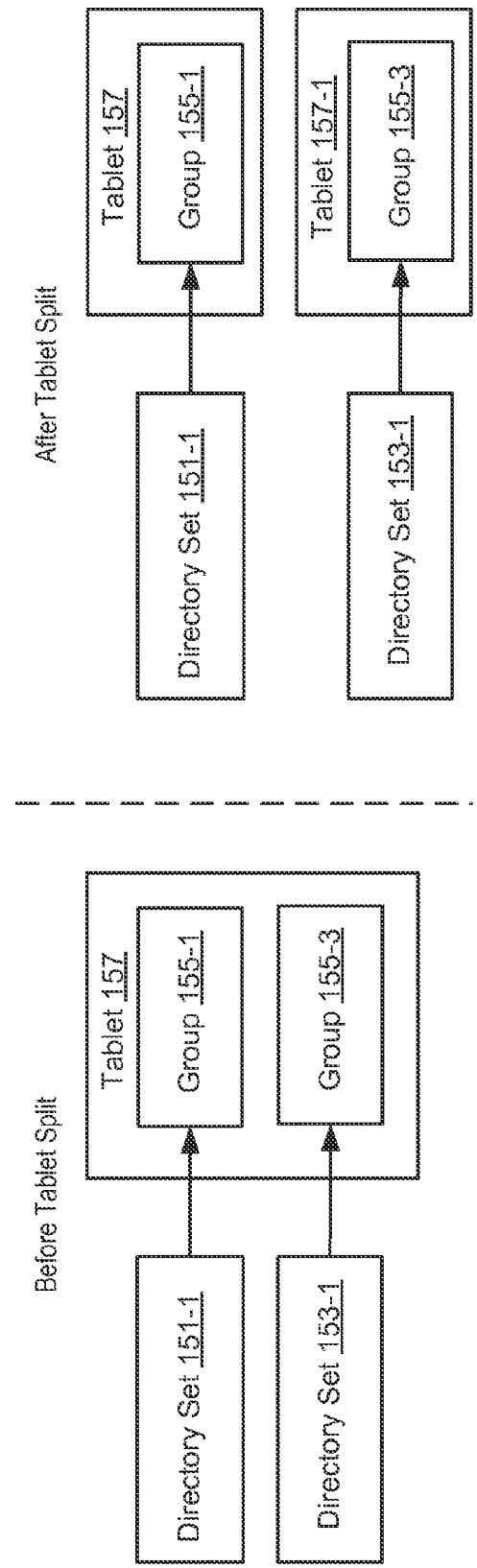

Note that splitting the group 155 within the tablet 157 does not affect any load at the tablet 157 because the new group 155-3 is within the same tablet 157 as the original group. In order to move away some load from the tablet 157, the tablet 157 needs to move some group to another tablet. As shown in FIG. 1G, the tablet 157 includes two groups 155-1 and 155-3, each group corresponding to a respective set of directories. In some embodiments, one group within a tablet is moved to another tablet within the same zone by having the two tablets sharing some data with each other. In some other embodiments, the target tablet (e.g., the tablet 157-1) reads directly from the source tablet (e.g., the tablet 157) without going through a tablet server that is responsible for managing the tablet 157. As such, the movement of groups between two tablets does not add additional load to the tablet server. In conjunction with the movement of a group from one tablet to another tablet, the mapping between a directory (e.g., a member in the directory set 153-1) and a source tablet (e.g., the tablet 157) is updated to redirect to a target tablet (e.g., the tablet 157-1).

Figure 2A:
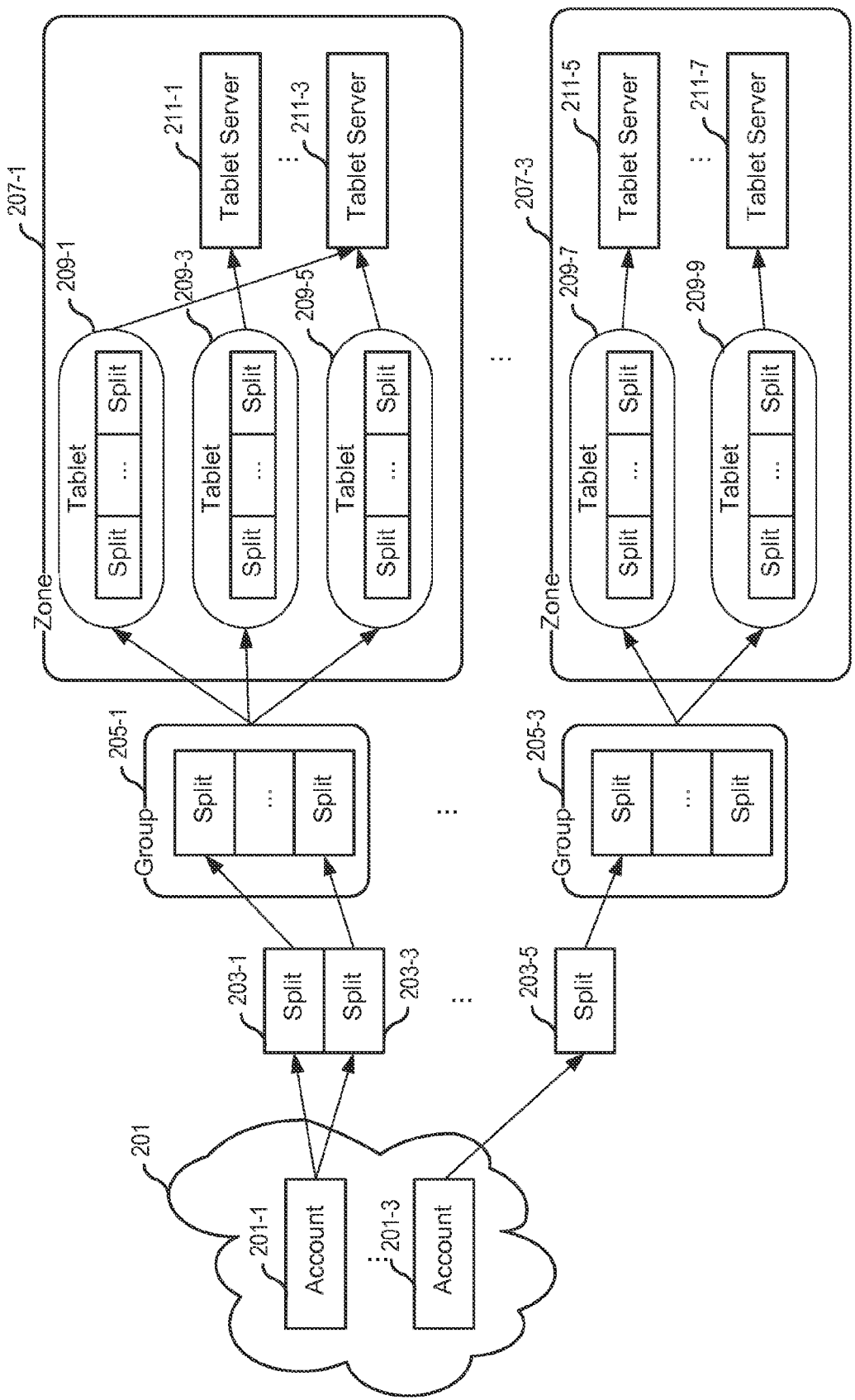
FIGS. 2A and 2B are block diagram and flow chart illustrating how data associated with different accounts is replicated within the distributed storage system in accordance with some embodiments.
Figure 2B:
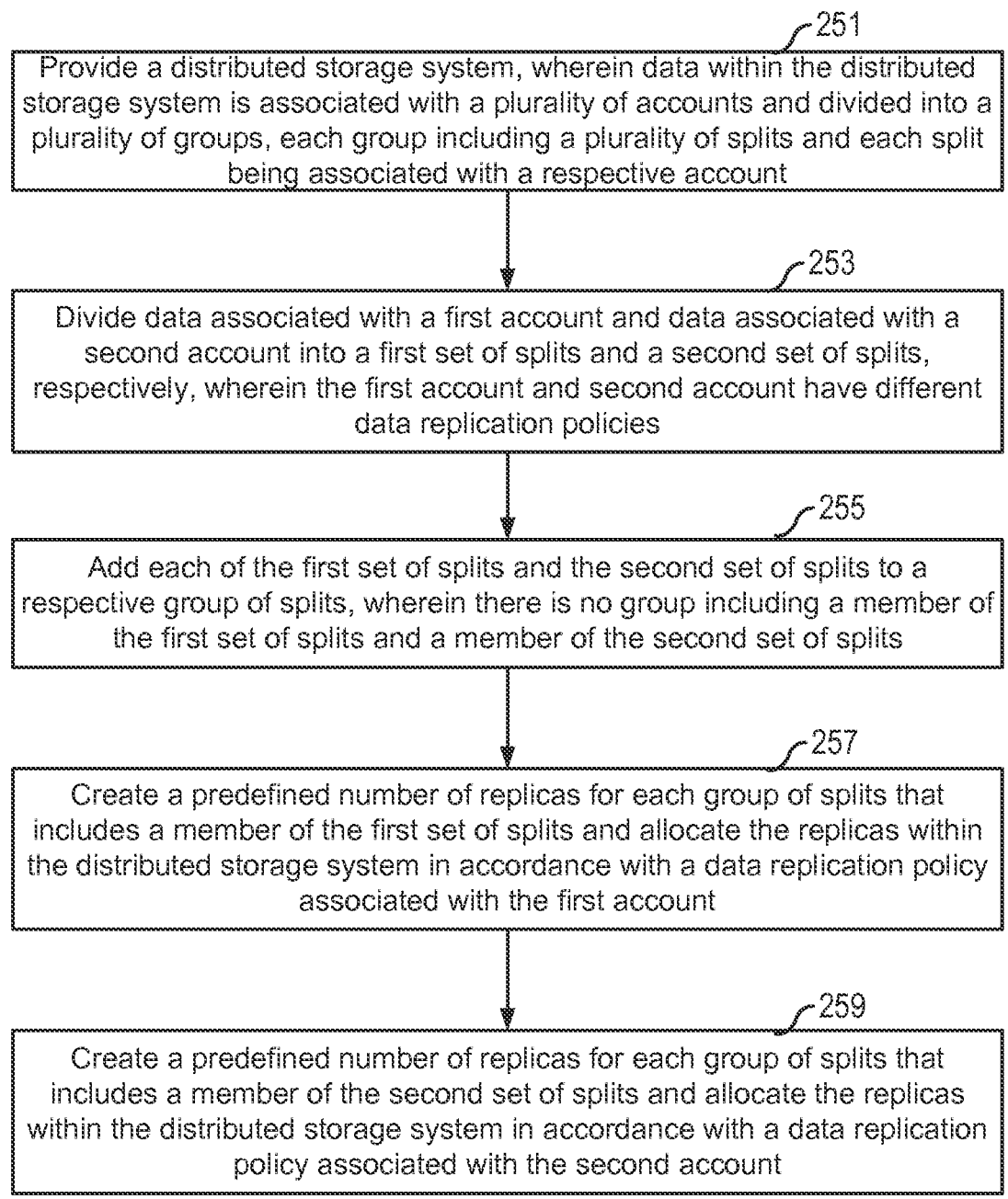

FIGS. 2A and 2B are block diagram and flow chart illustrating how data associated with different accounts is replicated within the distributed storage system in accordance with some embodiments. As shown in FIG. 2B, a distributed storage system is provided (251) for managing the data 201 associated with a plurality of accounts, including dividing the data into a plurality of groups, each group including a plurality of splits and each split being associated with a respective account. In particular, the data associated with a first account (e.g., the account 201-1 in FIG. 2A) is divided (253) into a first set of splits (e.g., the splits 203-1 and 203-3 in FIG. 2A) and the data associated with a second account (e.g., the account 201-3 in FIG. 2A) is divided (253) into a second set of splits (e.g., the split 203-5 in FIG. 2A). The distributed storage system adds (255) each of the first set of splits to a group of splits (e.g., the group 205-1 in FIG. 2A) and adds each of the second set of splits to a group of splits (e.g., the group 205-3 in FIG. 2A). In this example, it is assumed that the first account and second account have different data replication policies. For example, the first account may require that the distributed storage system create three replicas for its data and allocate the three replicas in a zone corresponding to North America and the second account may require that the distributed storage system create two replicas for its data and allocate the two replicas in a zone corresponding to Europe. Since the two accounts have different policies, a member of the first set of splits cannot be added to the group 205-3 that includes a member of the second set of splits. Similarly, a member of the second set of splits cannot be added to the group 205-1 that includes a member of the first set of splits. In other words, there is no group in the distributed storage system that includes both a member of the first set of splits and a member of the second set of splits.

By allowing each account to have its own data replication policy, the distribute storage system offers both flexibility and scalability to different types of online service applications that use the distributed storage system for storing their data. For example, an account that needs frequent access to its data from one or more geographical locations may specify such need in its data replication policy so that the distributed storage system may create more replicas for the data associated with the account at a zone close to the data accessing locations and reduce the latency required for a client to access such data.

As shown in FIG. 2A, the distributed storage system creates (257 in FIG. 2B) a predefined number (e.g., three) of replicas for each group of splits (e.g., the group 205-1) that includes a member of the first set of splits and allocates the three replicas in a zone (e.g., the zone 207-1) in accordance with the data replication policy associated with the first account. In this example, the zone 207-1 includes three tablets (209-1, 209-3, 209-5), each being one replica of the group 205-1, and each tablet includes a copy of the first set of splits associated with the first account 201-1. As described above, each tablet in a zone is assigned to a tablet server for managing data access requests directed to the tablet. In this case, the three tablets are managed by two tablet servers 211-1 and 211-3. In other words, tablets associated with the same group of splits may be managed by the same tablet server or different tablet servers depending on the load balance of the respective tablet servers in a zone. Similarly, the distributed storage system creates (259 in FIG. 2B) a predefined number (e.g., two) of replicas for each group of splits (e.g., the group 205-3) that includes a member of the second set of splits and allocates the replicas in a zone (e.g., the zone 207-3) in accordance with the data replication policy associated with the second account. In this example, the zone 207-3 includes two tablets (209-7, 209-9), each being a replica of the group 205-3, and each tablet includes a copy of the second set of splits associated with the second account 201-3 and is managed by a respective tablet server (211-5 or 211-7). It should be noted that the data replication policy of a group of splits is driven by the data replication policies of the different splits in the group, which are driven by the data replication policies of the accounts associated with the different splits. The distributed storage system is responsible for putting those splits having the same or similar data replication policies into the same group to improve the system's efficiency. In some embodiments, the enforcement of the account-level (or directory-level) data replication policy is determined by the distributed storage system based on the availability of resources at different zones. In other words, it is possible that the distributed storage system may not always store splits associated with a particular account strictly in accordance with the account's data replication policy. For example, the splits may be initially stored in a zone different from a zone defined by the account's data replication policy and then moved to the zone. In this case, the distributed storage system allows an account to specify its desired placement of the splits associated with, the account in the directory map and will try to satisfy such requirement whenever it is possible. In some embodiments, an account, may change its data replication policy from time to time. For example, an email account user may temporarily move from North America to Europe. When the email application detects such movement, it. may notify the distributed storage system to move tablets associated with the email account from a data center in North America to a data center in Europe to provide a better service to the end user.

Figure 3A:
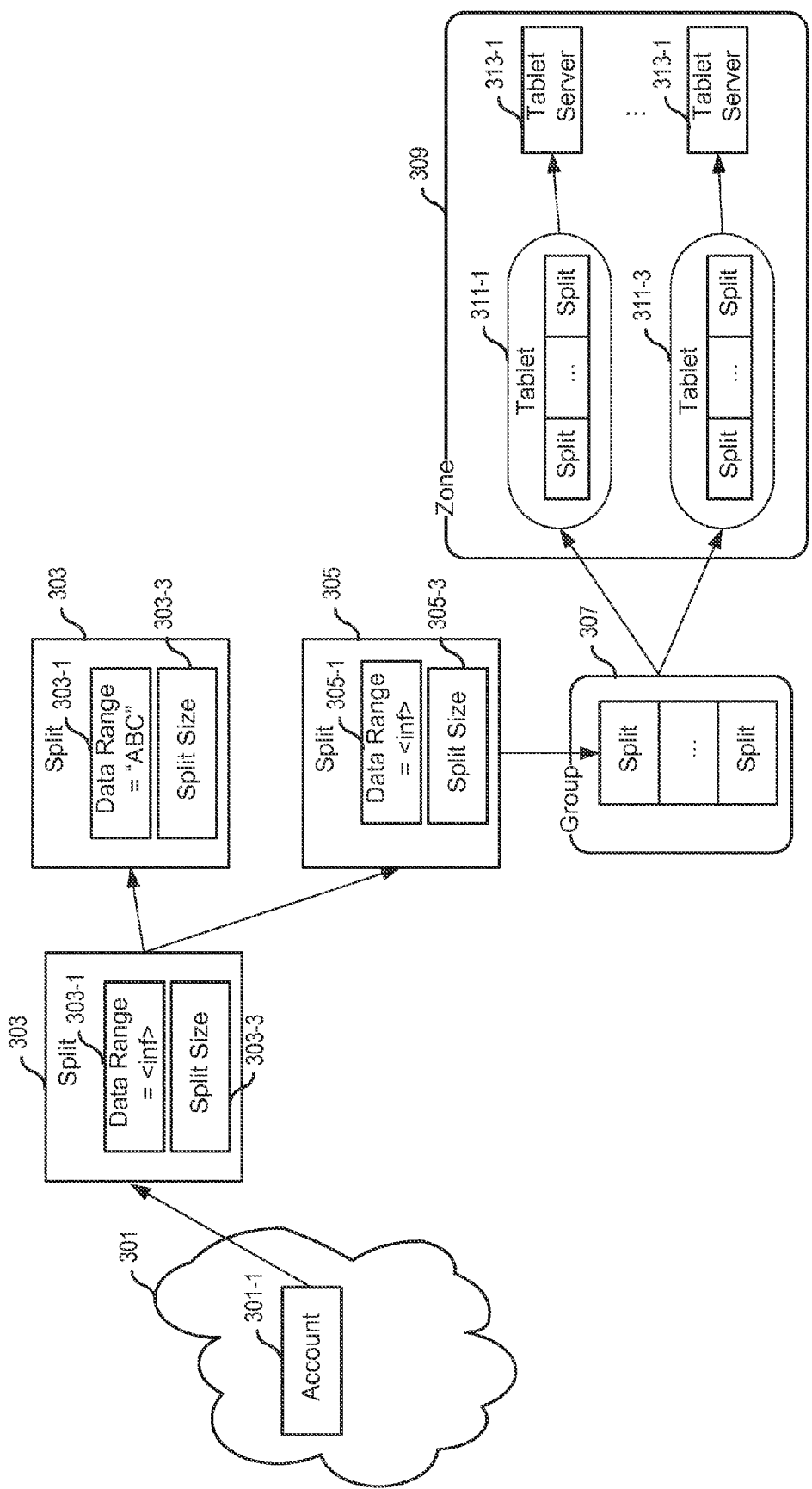
FIGS. 3A and 3B are block diagram and flow chart illustrating how data associated with an account is added within the distributed storage system in accordance with some embodiments.
Figure 3B:
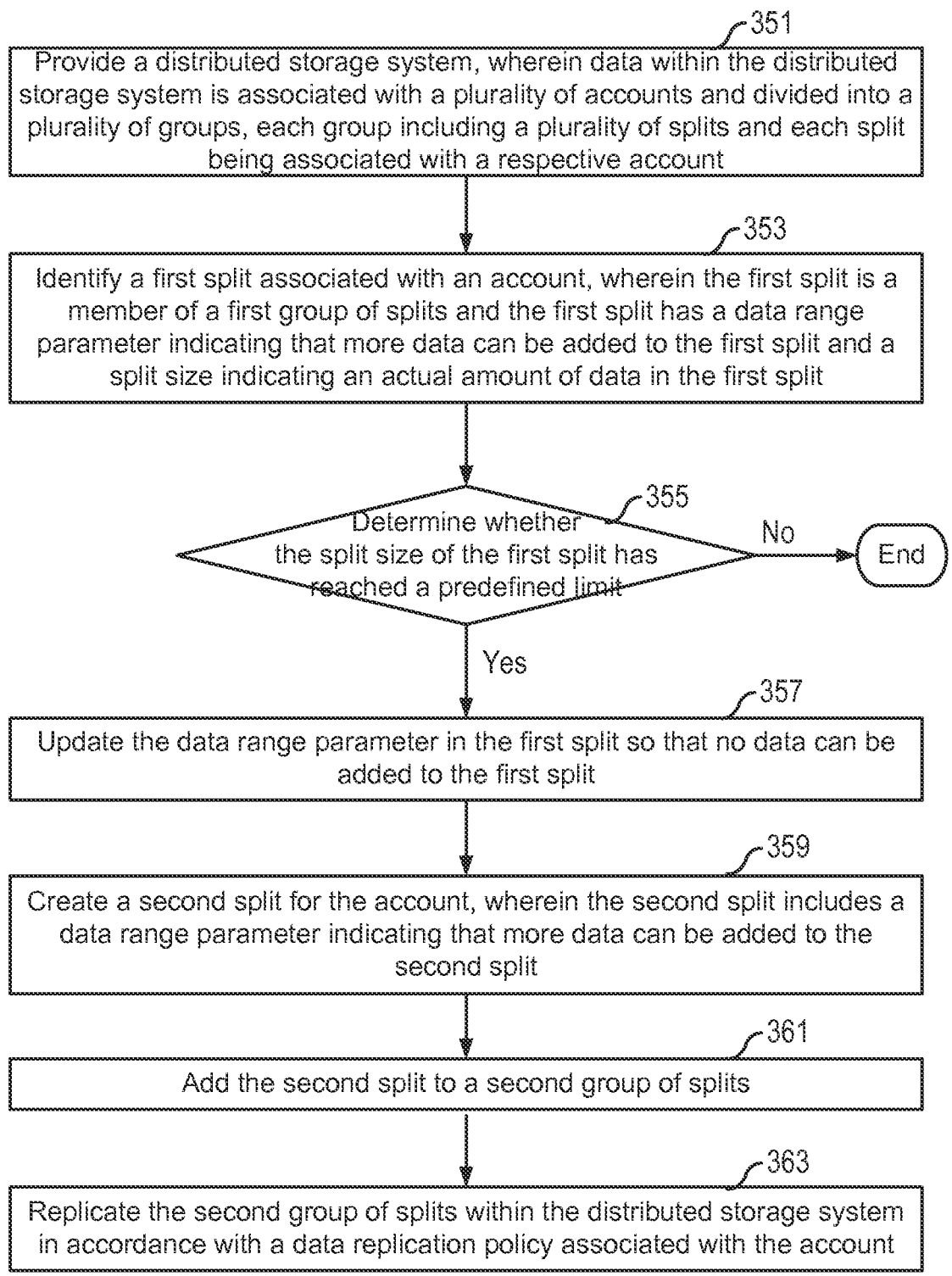

FIGS. 3A and 3B are block diagram and flow chart illustrating how data associated with an account is added within the distributed storage system in accordance with some embodiments. As noted above, the division of an account's data into one or more splits eliminates the data limit for a particular account managed by the distributed storage system because the distributed storage system can add new splits to an account when its existing split runs out of space. As shown in FIG. 3B, a distributed storage system is provided (351) for managing the data 301 associated with a plurality of accounts, including dividing the data into a plurality of groups, each group including a plurality of splits and each split being associated with a respective account. In particular, the data associated with an account (e.g., the account 301-1 in FIG. 3A) initially includes only one (e.g., the split 303 in FIG. 2A). As described above in connection with FIGS. 2A and 2B, this split is added to a group of splits and replicated within a particular zone as part of a set of tablets associated with the group in accordance with the data replication policy. As shown in FIG. 3B, the distributed storage system identities (353) a first split (e.g., the split 303 in FIG. 3A) associated with the account. In this example, the first split is the split 303 that includes multiple parameters including the data range parameter 303-1 and the split size parameter 303-3. Note that the value <inf> of the data range parameter 303-1 indicates that the split 303 still has space for more data to be added to the split and the split size parameter 303-3 represents the actual amount of data in the split 303.

In some embodiments, each account has only one split whose data range parameter has a value of <inf>. As shown in FIG. 3B, the distributed storage system determines (355) whether the split associated with the account reaches its limit according to a predefined schedule (e.g., periodically). If not (355—no), the distributed storage system stops checking this account and proceeds to check another account. Otherwise (355—yes), the distributed storage system will take further actions by creating a new split for the account.

As shown in FIG. 3A, when the existing split 303 runs out of space, the distributed storage system updates (357) the data range parameter in the split 303 from <inf> to "ABC." Note that the expression "ABC" is an expression that corresponds to the actual upper limit of the data within the split 303. From this parameter, the distributed storage system can tell what data is within each split. In response to a client request for a particular piece of data, the distributed storage system can use the data range parameter to determine which split or splits have the client-requested data. By doing so, the distributed storage system also marks the first split as not accepting any new data. The distributed storage system then creates (359) a second split (e.g., the split 305 in FIG. 3B) for the account. As shown in FIG. 3B, the second split 305 includes a data range parameter 305-1 that has a value of <inf> indicating that more data can be added to the second split and a split size parameter 305-3 that grows as more and more data is added to the second split 305. Moreover, the distributed storage system selects a second group of splits (e.g., the group 307 in FIG. 3A) for the second split 305 and adds (361) the second split to a second group of splits. It should be noted that the second group 307 may be the same group that includes the split 303 or a different one. Finally, the distributed storage system replicates (363) the second group of splits in a particular zone (e.g., the zone 309 in FIG. 3A) in accordance with a data replication policy associated with the account. In this example, the second group 307 has two tablets (311-1, 311-3) in the zone 309, which are managed by two respective tablet servers 313-1 and 313-3. In some embodiments, the creation of a new split for an account may be triggered by the movement of data within the distributed storage system, e.g., in response to a change of the data replication policy. In either case, the creation of new splits for the account ensures that the client can add more data to this account without disrupting the service associated with the account.

Figure 4A:
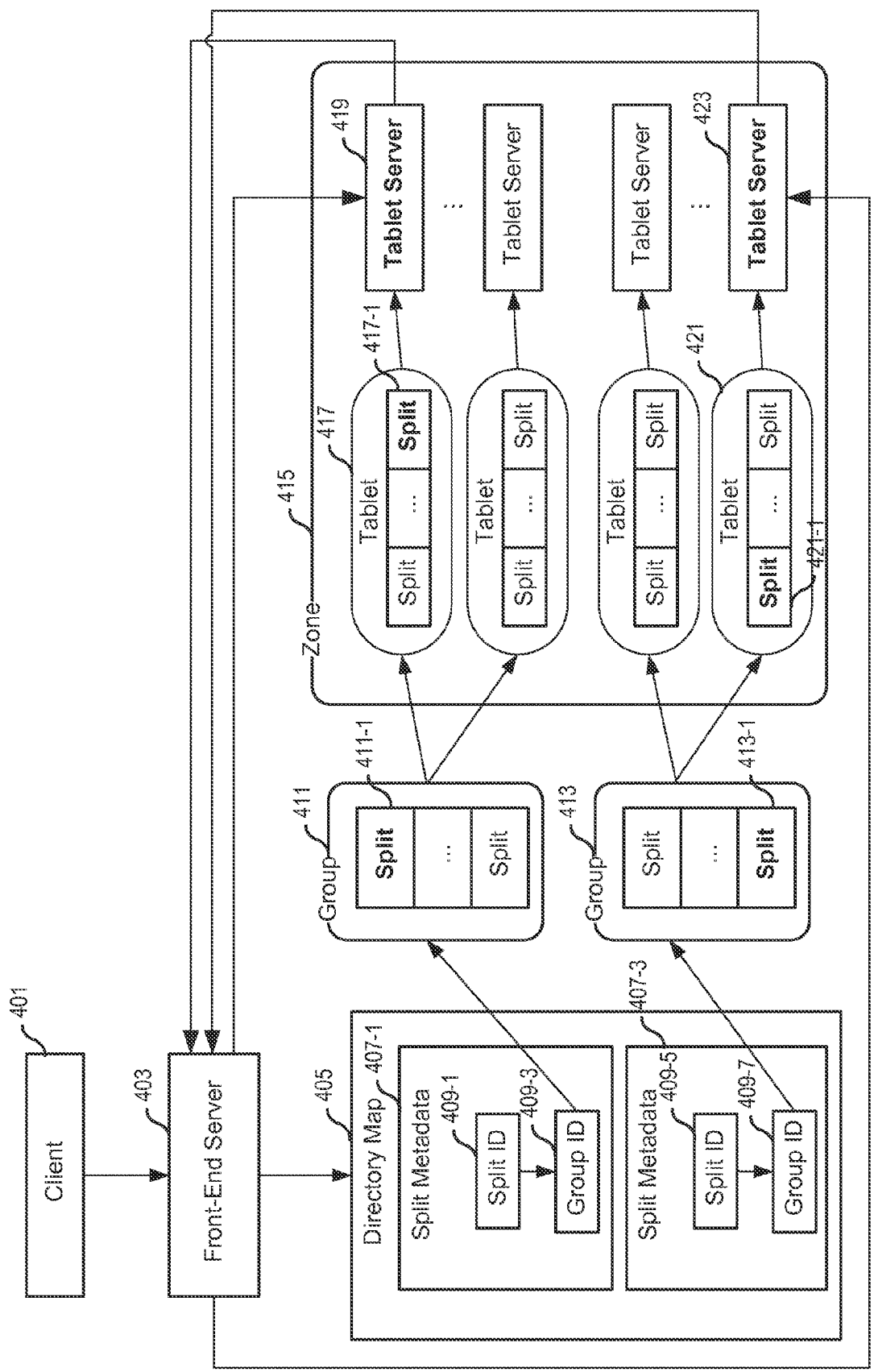
FIGS. 4A and 4B are block diagram and flow chart illustrating how data is located within the distributed storage system in response to a data access request from a client in accordance with some embodiments.
Figure 4B:
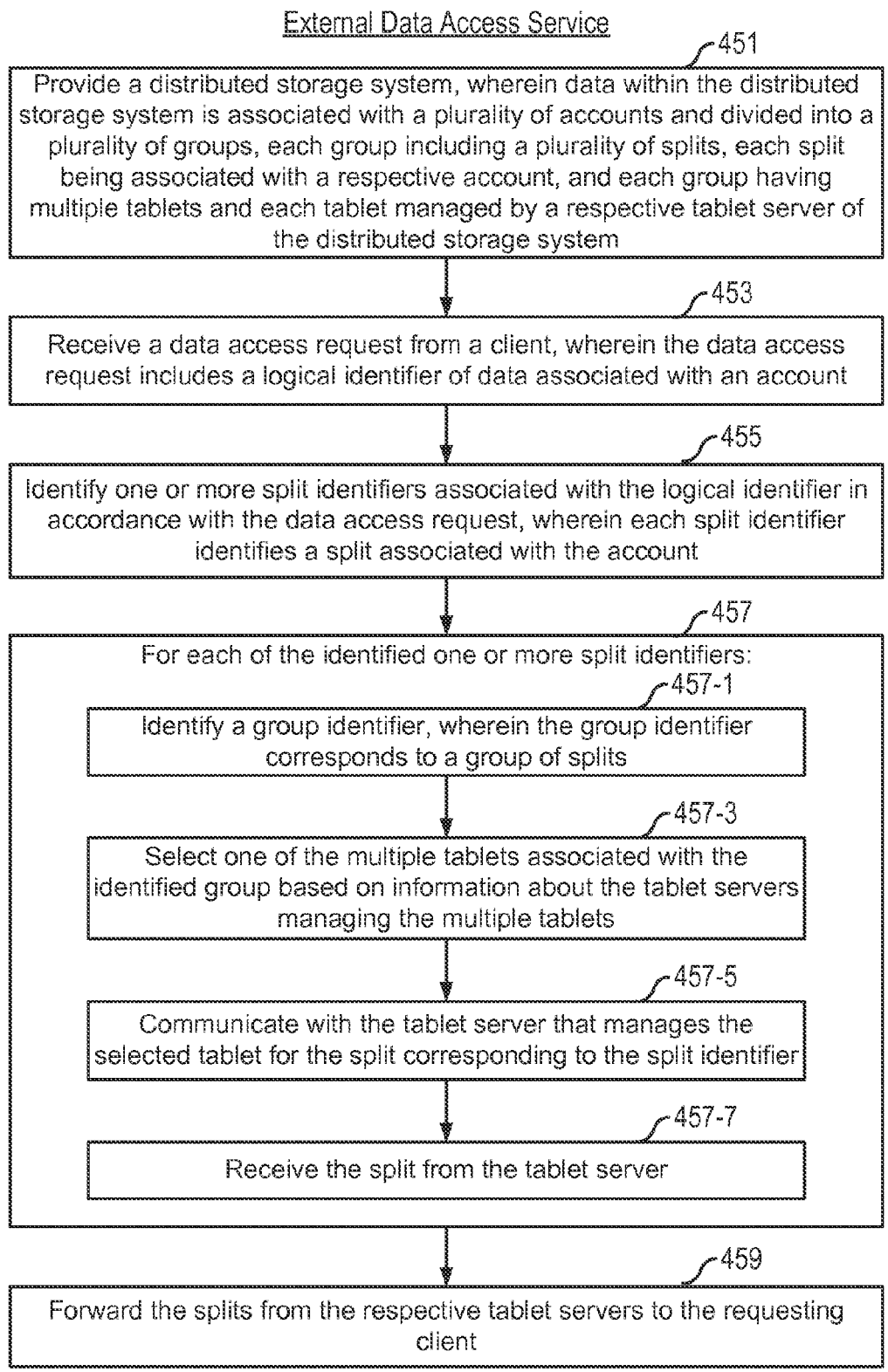

FIGS. 4A and 4B are block diagram and flow chart illustrating how data is located within the distributed storage system in response to a data access request from a client in accordance with some embodiments. As shown in FIG. 4B, a distributed storage system is provided (451) for managing data associated with a plurality of accounts, which is divided into a plurality of groups, each group including a plurality of splits, each split being associated with a respective account, and each group having multiple tablets and each tablet managed by a respective tablet server of the distributed storage system. A front-end server (403 in FIG. 4A) of the distributed storage system receives (453) a data access request from a client (401 in FIG. 4A). In some embodiments, the data access request includes a logical identifier (e.g., a directory identifier) of data associated with an account associated with the client.

In response, the front-end server (403 in FIG. 4A) identities (455) one or more split identifiers associated with the logical identifier in accordance with the data access request. As shown in FIG. 4A, the front-end server 403 identified two splits within the directory map 405, they are the split 407-1 and the split 407-3. Each split's metadata includes a split ID (409-1, 409-5) that identifies a split associated with the account. For each of the identified one or more split identifiers (457), the front-end server 403 identifies (457-1) a group identifier (e.g., the group IDs 409-3 and 409-7 in FIG. 4A), each group identifier corresponds to a group of splits. In the example shown in FIG. 4A, the group ID 409-3 corresponds to the group 411 of splits that includes a split 411-1 corresponding to the split 407-1 in the director map 405 and the group ID 409-7 corresponds to the group 413 of splits that includes a split 413-1 corresponding to the split 407-3 in the directory map 405. The distributed storage system selects (457-3) one of the multiple tablets associated with each identified group based on information about the tablet servers managing the multiple tablets. For example, the zone 415 includes two tablets associated with each of the two identified groups 411 and 413. In particular, the tablet 417 is identified for the group 411 and the tablet 417 includes a split 417-1 that corresponds to the split 407-1 in the directory map 405. The tablet 421 is identified for the group 413 and the tablet 421 includes a split 421-1 that corresponds to the split 407-3 in the directory map 405. For each selected tablet, there is a corresponding tablet, server in the zone 415 that is responsible for managing data access requests to the tablet. In this example, the tablet server 419 is responsible for managing the tablet 417 and the tablet server 423 is responsible for managing the tablet 421. After identifying each tablet server, the front-end server 403 communicates (457-5) with the tablet server that manages the selected tablet for the split corresponding to the split identifier for the split associated with the client request and receives (457-7) the split from the tablet server. After receiving the splits from different, tablet servers, the front-end server forwards (459) the splits from the respective tablet servers to the requesting client in satisfying the client's data access request. It should be noted that the client access request may be a read-only request or a read-and-write request. Since each group of splits includes multiple tablets, any data update to one split within the group should be replicated within each tablet associated with the group.

Figure 5:
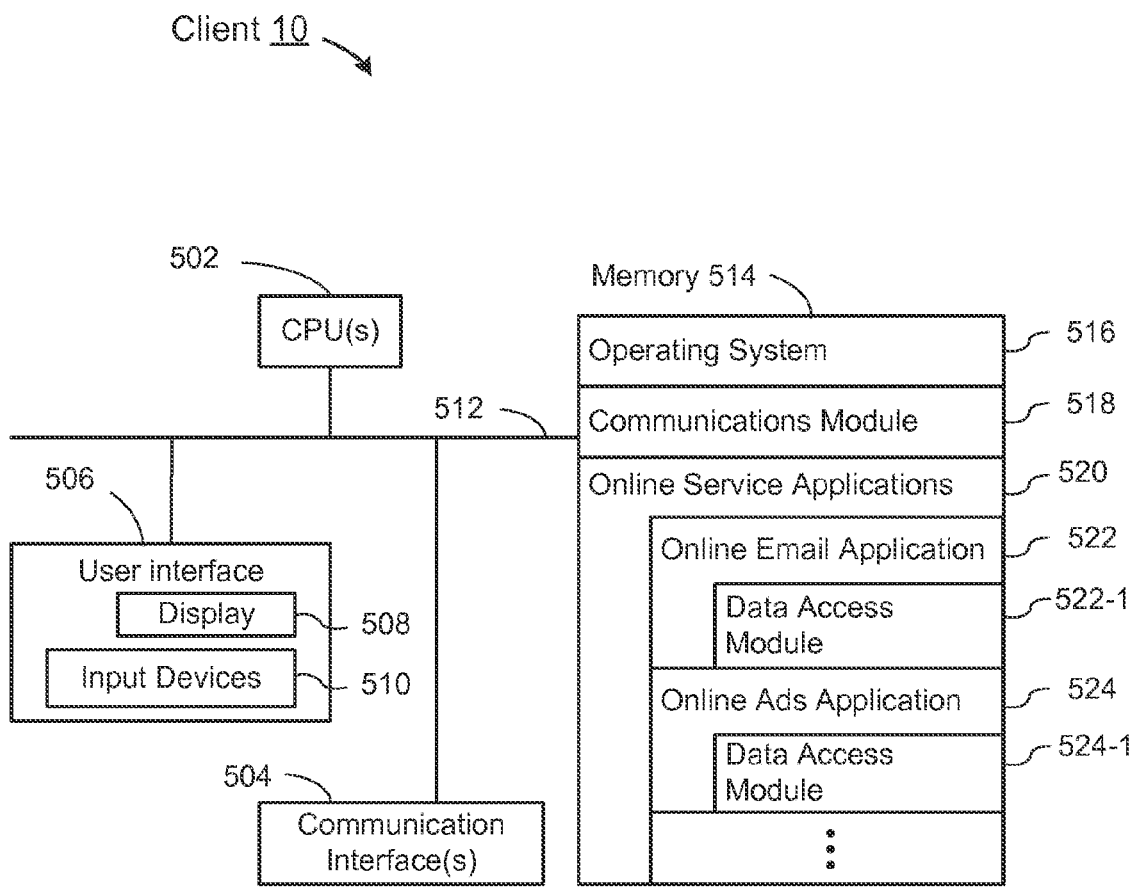
FIG. 5 is a block diagram illustrating the components of the client in accordance with some embodiments.

FIG. 5 is a block diagram illustrating the components of the client in accordance with some embodiments. The client 10 is a computer server that includes one or more processing units (CPU's) 502 for executing modules, programs and/or instructions stored in the memory 514 and thereby performing processing operations; one or more network or other communications interfaces 504; memory 514; and one or more communication buses 512 for interconnecting these components. In some implementations, the client 10 includes a user interface 406 comprising a display device 508 and one or more input devices 510 (e.g., keyboard or mouse or remote control). In some implementations, the memory 514 includes high-speed random access memory, such as DRAM, SRAM, DDR RAM or other random access solid state memory devices. In some implementations, memory 514 includes non-volatile memory, such as one or more magnetic disk storage devices, optical disk storage devices, flash memory devices, or other non-volatile solid state storage devices. In some implementations, memory 514 includes one or more storage devices remotely located from the CPU(s) 502. Memory 514, or alternately the non-volatile memory device(s) within memory 514, comprises a non-transitory computer readable storage medium. In some implementations, memory 514 or the non-transitory computer readable storage medium of memory 514 stores the following elements, or a subset of these elements, and may also include additional elements:

- an operating system 516 that includes procedures for handling various basic system services and for performing hardware dependent tasks;
- a network communications module 518 that is used for coupling the client 10 to the distributed storage system 100 via the communication network interfaces 504 and one or more communication networks (wired or wireless), such as the network 20, other wide area networks, local area networks, metropolitan area networks, and so on; and
- one or more online service applications 520, such as an online email application 522 that includes a data access module 522-1 for communicating with the distributed storage system 100 for exchanging data, an online advertising application 524 that includes a data access module 524-1 for communicating with the distributed storage system 100 for exchanging data, etc.

Figure 6:
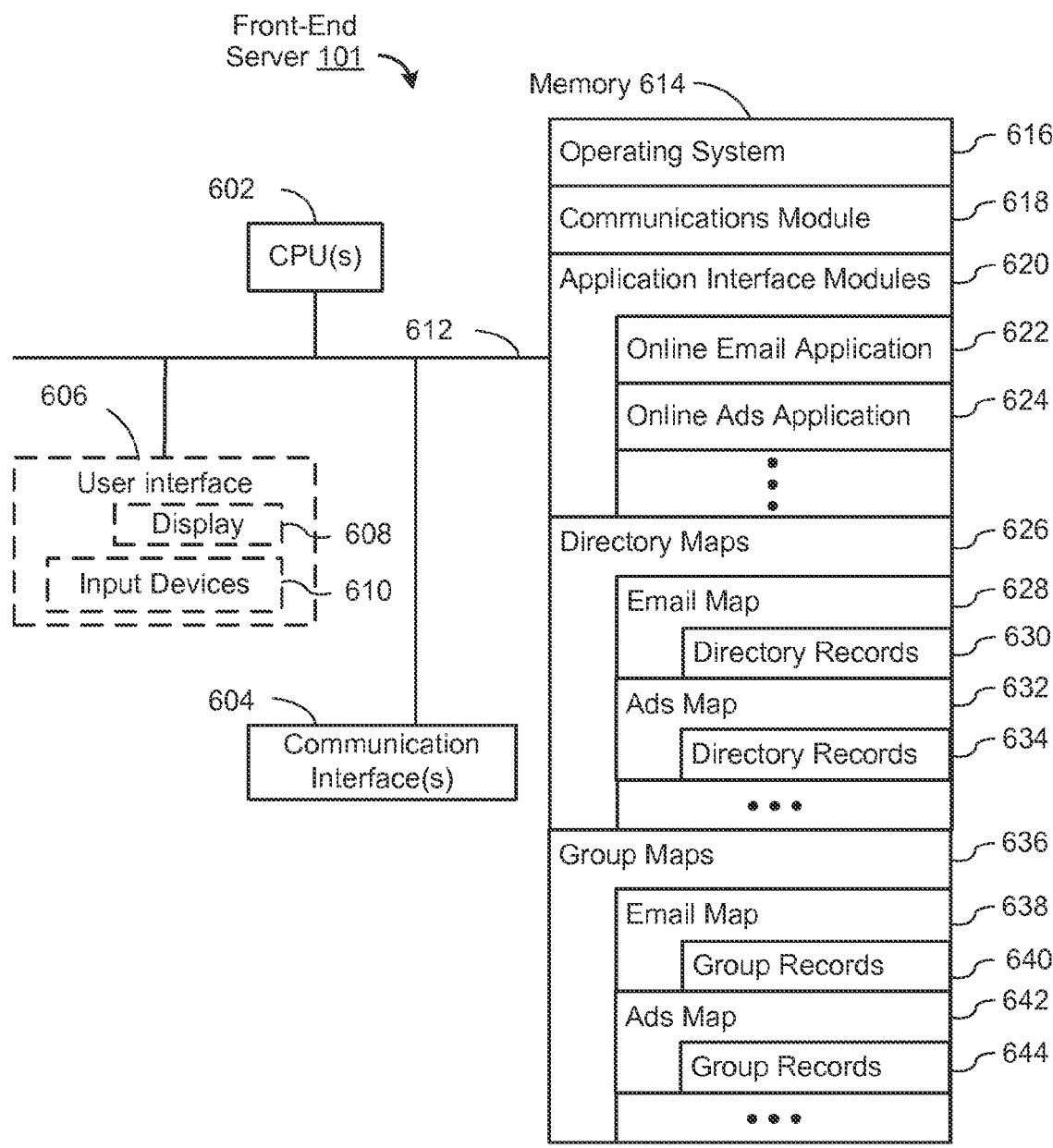
FIG. 6 is a block diagram illustrating the components of a front-end server of the distributed storage system in accordance with some embodiments.

FIG. 6 is a block diagram illustrating the components of a front-end server of the distributed storage system in accordance with some embodiments. The front-end server 101 includes one or more processing units (CPU's) 602 for executing modules, programs and/or instructions stored in the memory 614 and thereby performing processing operations; one or more network or other communications interfaces 604; memory 614; and one or more communication buses 612 for interconnecting these components. In some implementations, the front-end server 101 includes an optional user interface 606 including a display device 608 and one or more input devices 610 (e.g., keyboard or mouse or remote control). In some implementations, the memory 614 includes high-speed random access memory, such as DRAM, SRAM, DDR RAM or other random access solid state memory devices. In some implementations, memory 614 includes non-volatile memory, such as one or more magnetic disk storage devices, optical disk storage devices, flash memory devices, or other non-volatile solid state storage devices. In some implementations, memory 614 includes one or more storage devices remotely located from the CPU(s) 602. Memory 614, or alternately the non-volatile memory device(s) within memory 614, comprises a non-transitory computer readable storage medium. In some implementations, memory 614 or the non-transitory computer readable storage medium of memory 614 stores the following elements, or a subset of these elements, and may also include additional elements:

- an operating system 616 that includes procedures for handling various basic system services and for performing hardware dependent tasks;
- a network communications module 618 that is used for connecting the front-send server 101 to other devices (e.g., the clients 10 and the other components in the distributed storage system 100 such as the zones) via the communication network interfaces 604 and one or more communication networks (wired or wireless), such as the network 20, other wide area networks, local area networks, metropolitan area networks, and so on;

a plurality of application interface modules 620, such as an online email application module 622 for exchanging data with the data access module 522-1 in the client 10, an online advertising application module 624 for exchanging data with the data access module 524-1 in the client 10, etc;

a plurality of directory maps 626, such as an online email application directory map 628 including a plurality of records 630 defining the relationship between different email accounts with their respective splits in the distributed storage system, an online advertising application directory map 632 including a plurality of records 634 defining the relationship between different advertising customer accounts with their respective splits in the distributed storage system, etc; and a plurality of group maps 636, such as an online email application directory map 638 including a plurality of records 640 defining the relationship between different groups with their respective sets of tablets in the distributed storage system, an online advertising application directory map 642 including a plurality of records 644 defining the relationship between different groups with their respective sets of tablets in the distributed storage system, etc.

Figure 7:
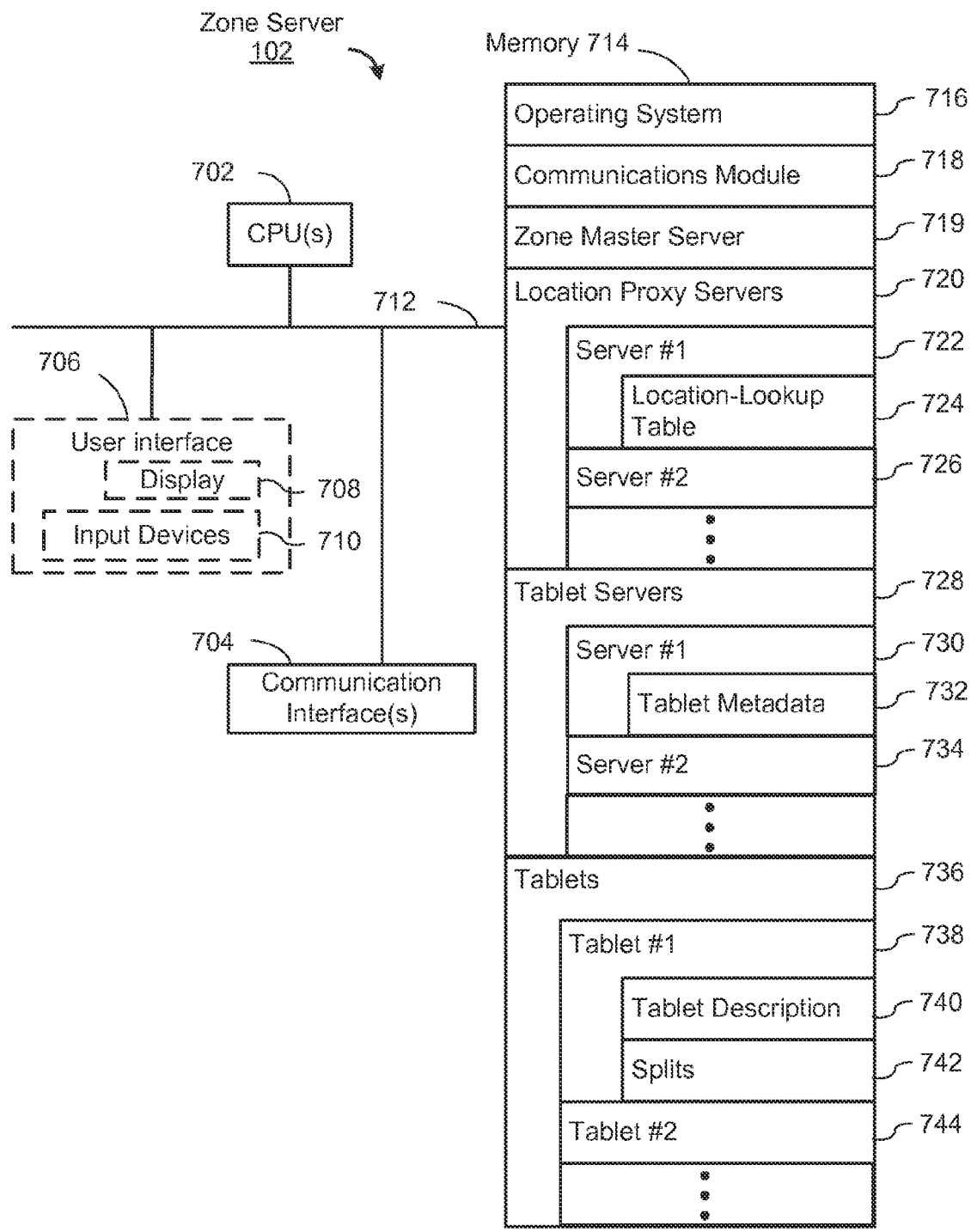
FIG. 7 is a block diagram illustrating the components of a zone of the distributed storage system in accordance with some embodiments.

FIG. 7 is a block diagram illustrating the components of a zone of the distributed storage system in accordance with some embodiments. The zone servers 102 include one or more processing units (CPU's) 702 for executing modules, programs and/or instructions stored in the memory 714 and thereby performing processing operations; one or more network or other communications interfaces 704; memory 714; and one or more communication buses 712 for interconnecting these components. In some implementations, the zone servers 102 includes an optional user interface 706 comprising a display device 708 and one or more input devices 710 (e.g., keyboard or mouse or remote control). In some implementations, the memory 714 includes high-speed random access memory, such as DRAM, SRAM, DDR RAM or other random access solid state memory devices. In some implementations, memory 714 includes non-volatile memory, such as one or more magnetic disk storage devices, optical disk storage devices, flash memory devices, or other non-volatile solid state storage devices. In some implementations, memory 714 includes one or more storage devices remotely located from the CPU(s) 702. Memory 714, or alternately the non-volatile memory device(s) within memory 714, comprises a non-transitory computer readable storage medium. In some implementations, memory 714 or the non-transitory computer readable storage medium of memory 714 stores the following elements, or a subset of these elements, and may also include additional elements:

an operating system 716 that includes procedures for handling various basic system services and for performing hardware dependent tasks;

a network communications module 718 that is used for connecting the zone servers 102 to other devices (e.g., the front-end servers 101) via the communication network interfaces 704 and one or more communication networks (wired or wireless), such as the network links 104, other wide area networks, local area networks, metropolitan area networks, and so on;

a zone master server 719 for managing the location proxy servers 720 and the tablet servers 728 within each zone;

a plurality of location proxy servers 720, each server (722, 726) further including a location-lookup table 724 for identifying a map between a respective tablet and a respective tablet server;

a plurality of tablet servers 728, each server (730, 734) further including tablet metadata 732 for managing a plurality of tablets such as the data access requests directed to the tablets; and a plurality of tablets 736, each tablet (738, 744) further including a tablet description 740 and a plurality of splits 742.

Reference has been made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. For example, it is possible for a front-end server to return a split associated with an account to a client in its native format used by the distributed storage system and the client then converts the raw split into a format defined by the client. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method, comprising:
   at a computer server including one or more processors and memory:
   providing a distributed storage system, wherein data within the distributed storage system is associated with a plurality of accounts and divided into a plurality of groups, each group including a plurality of splits and each split being associated with a respective account;
   dividing data associated with a first account and data associated with a second account into a first set of splits and a second set of splits, respectively, wherein the first account and the second account have different data replication policies;
   adding each of the first set of splits and the second set of splits to a respective group of splits, wherein there is no group including a member of the first set of splits and a member of the second set of splits;
   creating a first predefined number of replicas for each group of splits that includes a member of the first set of splits and allocating the replicas within the distributed storage system in accordance with a first data replication policy associated with the first account; and
   creating a second predefined number of replicas for each group of splits that includes a member of the second set of splits and allocating the replicas within the distributed storage system in accordance with a second data replication policy associated with the second account.

2. The computer-implemented method of claim 1, wherein the first account and the second account are associated with one application that uses the distributed storage system for storing data associated with the application.

3. The computer-implemented method of claim 1, wherein the first account and the second account are associated with two respective applications, each respective application using the distributed storage system for storing data associated with the respective application.

4. The computer-implemented method of claim 1, wherein the data replication policy associated with the first account includes information that specifies a number of replicas and their respective locations for each of the first set of splits.

5. The computer-implemented method of claim 1, wherein members of the first set of splits are added to two or more groups of splits and members of the second set of splits are added to one group of splits.

6. The computer-implemented method of claim 5, wherein the one group of splits corresponding to the second set of splits is replicated within two or more zones of the distributed storage system according to the data replication policy associated with the second account.

7. The computer-implemented method of claim 1, wherein the first predefined number of replicas is different from the second predefined number of replicas.

8. A distributed storage system, comprising:
   a plurality of zones, each zone including a plurality of computer servers and each computer server including one or more processors and memory;
   a plurality of network links that connects two respective zones, wherein data within the distributed storage system is associated with a plurality of accounts and divided into a plurality of groups, each group including a plurality of splits and each split being associated with a respective account; and
   a plurality of program modules, wherein the plurality of program modules are stored in the memory of a respective computer server and to be executed by the one or more processors of the respective computer server, and the plurality of program modules include instructions for:
   dividing data associated with a first account and data associated with a second account into a first set of splits and a second set of splits, respectively, wherein the first account and the second account have different data replication policies;
   adding each of the first set of splits and the second set of splits to a respective group of splits, wherein there is no group including a member of the first set of splits and a member of the second set of splits;
   creating a predefined number of replicas for each group of splits that includes a member of the first set of splits and allocating the replicas within the distributed storage system in accordance with a data replication policy associated with the first account; and
   creating a predefined number of replicas for each group of splits that includes a member of the second set of splits and allocating the replicas within the distributed storage system in accordance with a data replication policy associated with the second account.

9. The distributed storage system of claim 8, wherein the first account and the second account are associated with one application that uses the distributed storage system for storing data associated with the application.

10. The distributed storage system of claim 8, wherein the data replication policy associated with the first account includes information that specifies a number of replicas and their respective locations for each of the first set of splits.

11. The distributed storage system of claim 8, wherein members of the first set of splits are added to two or more groups of splits and members of the second set of splits are added to one group of splits.

12. The distributed storage system of claim 11, wherein the one group of splits corresponding to the second set of splits is replicated within two or more zones of the distributed storage system according to the data replication policy associated with the second account.

13. The distributed storage system of claim 8, wherein the first predefined number of replicas is different from the second predefined number of replicas.

14. A non-transitory computer readable storage medium storing one or more program modules configured for execution by a computer server that includes one or more processors and memory and is part of a distributed storage system, wherein the distributed storage system is configured for dividing data associated with a plurality of accounts into a plurality of groups, each group including a plurality of splits and each split being associated with a respective account, the one or more programs comprising instructions for:
    dividing data associated with a first account and data associated with a second account into a first set of splits and a second set of splits, respectively, wherein the first account and the second account have different data replication policies;
    adding each of the first set of splits and the second set of splits to a respective group of splits, wherein there is no group including a member of the first set of splits and a member of the second set of splits;
    creating a predefined number of replicas for each group of splits that includes a member of the first set of splits and allocating the replicas within the distributed storage system in accordance with a data replication policy associated with the first account; and
    creating a predefined number of replicas for each group of splits that includes a member of the second set of splits and allocating the replicas within the distributed storage system in accordance with a data replication policy associated with the second account.

15. The non-transitory computer readable storage medium of claim 14, wherein the first account and the second account are associated with one application that uses the distributed storage system for storing data associated with the application.

16. The non-transitory computer readable storage medium of claim 14, wherein the data replication policy associated with the first account includes information that specifies a number of replicas and their respective locations for each of the first set of splits.

17. The non-transitory computer readable storage medium of claim 14, wherein members of the first set of splits are added to two or more groups of splits and members of the second set of splits are added to one group of splits.

18. The non-transitory computer readable storage medium of claim 17, wherein the one group of splits corresponding to the second set of splits is replicated within two or more zones of the distributed storage system according to the data replication policy associated with the second account.

19. The non-transitory computer readable storage medium of claim 14, wherein the first predefined number of replicas is different from the second predefined number of replicas.

20. A computer-implemented method, comprising:
    at a computer server including one or more processors and memory:
        providing a distributed storage system, wherein data within the distributed storage system is associated with a plurality of accounts and divided into a plurality of groups, each group including a plurality of splits and each split being associated with a respective account;
        identifying a first split associated with an account, wherein the first split is a member of a first group of splits and the first split has a data range parameter indicating that more data can be added to the first split and a split size indicating an actual amount of data in the first split;
        in response to determining that the split size of the first split has reached a predefined limit:
            updating the data range parameter in the first split so that no additional data can be added to the first split;
            creating a second split for the account, wherein the second split includes a data range parameter indicating that more data can be added to the second split;
            adding the second split to a second group of splits; and
            replicating the second group of splits within the distributed storage system in accordance with a data replication policy associated with the account.

\* \* \* \* \*